US011976851B2

(12) United States Patent
Iwata et al.

(10) Patent No.: US 11,976,851 B2
(45) Date of Patent: May 7, 2024

(54) REFRIGERATION CYCLE DEVICE

(71) Applicant: DAIKIN INDUSTRIES, LTD., Osaka (JP)

(72) Inventors: Ikuhiro Iwata, Osaka (JP); Eiji Kumakura, Osaka (JP); Kazuhiro Furusho, Osaka (JP); Ryusuke Fujiyoshi, Osaka (JP); Hiromune Matsuoka, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 498 days.

(21) Appl. No.: 17/282,134

(22) PCT Filed: Sep. 30, 2019

(86) PCT No.: PCT/JP2019/038452
§ 371 (c)(1),
(2) Date: Apr. 1, 2021

(87) PCT Pub. No.: WO2020/071300
PCT Pub. Date: Apr. 9, 2020

(65) Prior Publication Data
US 2021/0372671 A1    Dec. 2, 2021

(30) Foreign Application Priority Data

Oct. 2, 2018 (JP) ................. 2018-187367

(51) Int. Cl.
*F25B 13/00* (2006.01)
*F25B 7/00* (2006.01)

(52) U.S. Cl.
CPC ............... *F25B 13/00* (2013.01); *F25B 7/00* (2013.01); *F25B 2313/006* (2013.01);
(Continued)

(58) Field of Classification Search
CPC ...... F25B 13/00; F25B 7/00; F25B 2313/006; F25B 2313/0213; F25B 2313/0233; F25B 2313/02742
See application file for complete search history.

(56) References Cited

U.S. PATENT DOCUMENTS

| 7,526,924 B2 | 5/2009 | Wakamoto et al. |
| 2007/0271936 A1 | 11/2007 | Wakamoto et al. |

(Continued)

FOREIGN PATENT DOCUMENTS

| CN | 203964427 U | 11/2014 |
| EP | 3 425 306 A1 | 1/2019 |

(Continued)

OTHER PUBLICATIONS

Machine English translation of WO2005052467 A1. (Year: 2005).*
(Continued)

*Primary Examiner* — Marc E Norman
(74) *Attorney, Agent, or Firm* — BIRCH, STEWART, KOLASCH & BIRCH, LLP

(57) ABSTRACT

A refrigeration cycle device that includes a main refrigerant circuit and a sub-refrigerant circuit cools or heats a main refrigerant that flows between a main heat-source-side heat exchanger and a main usage-side heat exchanger by causing a sub-usage-side heat exchanger to function as an evaporator or a radiator of a sub-refrigerant. A first main expansion mechanism and a second main expansion mechanism that decompress the main refrigerant are provided on an upstream side and a downstream side of the sub-usage-side heat exchanger of the main refrigerant circuit.

11 Claims, 6 Drawing Sheets

(52) U.S. Cl.
CPC ............... *F25B 2313/0213* (2013.01); *F25B 2313/0233* (2013.01); *F25B 2313/02742* (2013.01)

(56) References Cited

U.S. PATENT DOCUMENTS

| | | |
|---|---|---|
| 2009/0158761 A1 | 6/2009 | Wakamoto et al. |
| 2010/0251741 A1 | 10/2010 | Yoshimi et al. |
| 2011/0072836 A1 | 3/2011 | Wang et al. |
| 2012/0234026 A1 | 9/2012 | Oh et al. |
| 2016/0265814 A1 | 9/2016 | Pfister |
| 2016/0320105 A1* | 11/2016 | Okazaki .................. F25B 7/00 |
| 2018/0195794 A1 | 7/2018 | Saunders et al. |
| 2021/0215398 A1* | 7/2021 | Iwata .................... F25B 41/39 |
| 2021/0356177 A1* | 11/2021 | Kumakura ............... F25B 7/00 |
| 2022/0003461 A1* | 1/2022 | Iwata .................... F25B 40/02 |

FOREIGN PATENT DOCUMENTS

| | | | |
|---|---|---|---|
| JP | 2006-194565 A | 7/2006 |
| JP | 2007-3169 A | 1/2007 |
| JP | 2007-225265 A | 9/2007 |
| JP | 2008-249219 A | 10/2008 |
| JP | 2009-36508 A | 2/2009 |
| JP | 4753719 B2 | 8/2011 |
| JP | 4804396 B2 | 11/2011 |
| JP | 2012-6962 A | 4/2012 |
| JP | 2012-189258 A | 10/2012 |
| JP | 2013-130358 A | 7/2013 |
| JP | 2013-139938 A | 7/2013 |
| JP | 2013-160427 A | 8/2013 |
| JP | 2013-210133 A | 10/2013 |
| JP | 2013-210155 A | 10/2013 |
| JP | 2013-210158 A | 10/2013 |
| WO | WO 2005/052467 A1 | 6/2005 |
| WO | WO 2012/002248 A1 | 1/2012 |
| WO | WO 2017/150349 A1 | 9/2017 |

OTHER PUBLICATIONS

Extended European Search Report for European Application No. 19869333.5, dated Oct. 15, 2021.
Extended European Search Report for European Application No. 19869334.3, dated Oct. 21, 2021.
International Preliminary Report on Patentability and English translation of the Written Opinion of the International Searching Authority for International Application No. PCT/JP2019/038452, dated Apr. 15, 2021.
International Search Report, issued in PCT/JP2019/038452, PCT/ISA/210, dated Nov. 26, 2019.

* cited by examiner

REFRIGERATION CYCLE DEVICE

TECHNICAL FIELD

The present disclosure relates to a refrigeration cycle device that includes a main refrigerant circuit in which a main refrigerant circulates and a sub-refrigerant circuit in which a sub-refrigerant circulates, and that is configured to, by causing a sub-usage-side heat exchanger of the sub-refrigerant circuit to function as an evaporator or a radiator of the sub-refrigerant, cool or heat the main refrigerant that flows between a main heat-source-side heat exchanger of the main refrigerant circuit and a main usage-side heat exchanger of the main refrigerant circuit.

BACKGROUND ART

Hitherto, there has existed a refrigeration cycle device that includes a main refrigerant circuit having a main compressor, a main heat-source-side heat exchanger, a main usage-side heat exchanger, and a main flow-path switching mechanism. As such a refrigeration cycle device, Patent Literature 1 (Japanese Patent No. 4753719) describes a device that further includes a sub-refrigerant circuit having a sub-compressor, a sub-heat-source-side heat exchanger, a sub-usage-side heat exchanger, and a sub-flow-path switching mechanism, and that is configured to, by causing the sub-usage-side heat exchanger to function as an evaporator or a radiator of the sub-refrigerant, cool or heat the main refrigerant that flows between the main heat-source-side heat exchanger and the main usage-side heat exchanger. Here, the main flow-path switching mechanism is capable of switching between a main cooling operation state, in which the main refrigerant is caused to circulate so that the main usage-side heat exchanger functions as an evaporator of the main refrigerant, and a main heating operation state, in which the main refrigerant is caused to circulate so that the main usage-side heat exchanger functions as a radiator of the main refrigerant. The sub-flow-path switching mechanism is capable of switching between a sub-cooling operation state, in which the sub-refrigerant is caused to circulate so that the sub-usage-side heat exchanger functions as an evaporator of the sub-refrigerant, and a sub-heating operation state, in which the sub-refrigerant is caused to circulate so that the sub-usage-side heat exchanger functions as a radiator of the sub-refrigerant. That is, in the refrigeration cycle device, when performing an operation performed by switching the main flow-path switching mechanism to the main cooling operation state (cooling operation), the sub-flow-path switching mechanism is switched to the sub-cooling operation state to cause the sub-usage-side heat exchanger to function as an evaporator of the sub-refrigerant, as a result of which it is possible to cool the main refrigerant that flows between the main heat-source-side heat exchanger and the main usage-side heat exchanger. In addition, in the refrigeration cycle device, when performing an operation performed by switching the main flow-path switching mechanism to the main heating operation state (heating operation), the sub-flow-path switching mechanism is switched to the sub-heating operation state to cause the sub-usage-side heat exchanger to function as a radiator of the sub-refrigerant, as a result of which it is possible to heat the main refrigerant that flows between the main heat-source-side heat exchanger and the main usage-side heat exchanger.

SUMMARY OF INVENTION

Technical Problem

In the refrigeration cycle device known in the art above, when performing the heating operation, the sub-usage-side heat exchanger that functions as a radiator (a heat dissipater) of the sub-refrigerant is capable of heating the main refrigerant that flows between the main heat-source-side heat exchanger and the main usage-side heat exchanger. Therefore, the enthalpy of the main refrigerant that is sent to the main heat-source-side heat exchanger is increased, and the heat-exchange amount that is required to evaporate the main refrigerant at the main heat-source-side heat exchanger can be decreased.

However, in the refrigeration cycle device known in the art above, since, at the sub-usage-side heat exchanger, the temperature difference with respect to the sub-refrigerant that exchanges heat with the main refrigerant is small, the heating capacity of the main refrigerant at the sub-usage-side heat exchanger is small. Therefore, it becomes difficult to increase the enthalpy of the main refrigerant that is sent to the main heat-source-side heat exchanger, and it tends to be difficult to decrease the heat-exchange amount that is required to evaporate the main refrigerant at the main heat-source-side heat exchanger.

Consequently, in the refrigeration cycle device that includes the main refrigerant circuit and the sub-refrigerant circuit and that is configured to, by causing the sub-usage-side heat exchanger to function as a radiator of the sub-refrigerant, heat the main refrigerant that flows between the main heat-source-side heat exchanger and the main usage-side heat exchanger, it is desirable that the heat-exchange amount that is required to evaporate the main refrigerant at the main heat-source-side heat exchanger be capable of being decreased when performing the heating operation.

Solution to Problem

A refrigeration cycle device according to a first aspect includes a main refrigerant circuit and a sub-refrigerant circuit. The main refrigerant circuit has a main compressor, a main heat-source-side heat exchanger, a main usage-side heat exchanger, a sub-usage-side heat exchanger, and a main flow-path switching mechanism. The main compressor is a compressor that compresses a main refrigerant. The main heat-source-side heat exchanger is a heat exchanger that functions as a radiator or an evaporator of the main refrigerant. The main usage-side heat exchanger is a heat exchanger that functions as an evaporator or a radiator of the main refrigerant. The sub-usage-side heat exchanger is a heat exchanger that functions as a cooler or a heater of the main refrigerant that flows between the main heat-source-side heat exchanger and the main usage-side heat exchanger. The main flow-path switching mechanism is a switching mechanism that switches between a main cooling operation state, in which the main refrigerant is caused to circulate so that the main usage-side heat exchanger functions as the evaporator of the main refrigerant, and a main heating operation state, in which the main refrigerant is caused to circulate so that the main usage-side heat exchanger functions as the radiator of the main refrigerant. The sub-refrigerant circuit has a sub-compressor, a sub-heat-source-side heat exchanger, the sub-usage-side heat exchanger, and a sub-flow-path switching mechanism. The sub-compressor is a compressor that compresses a sub-refrigerant. The sub-heat-source-side heat exchanger functions as a radiator or an evaporator of the sub-refrigerant. The sub-usage-side heat exchanger is a heat exchanger that functions as an evaporator of the sub-refrigerant and cools the main refrigerant that flows between the main heat-source-side heat exchanger and the main usage-side heat exchanger, or functions as a radiator of the sub-refrigerant and heats the main refrigerant that flows between the main usage-side heat exchanger and the main heat-source-side heat exchanger. The sub-flow-path switching mechanism is a switching mechanism that switches between a sub-cooling operation state, in which the sub-refrigerant is caused to circulate so that the sub-usage-side heat exchanger functions as the evaporator of the sub-refrigerant, and a sub-heating operation state, in which the sub-refrigerant is caused to circulate so that the sub-usage-side heat exchanger functions as the radiator of the sub-refrigerant. The main refrigerant circuit has a first main expansion mechanism that decompresses the main refrigerant that flows between one of the main heat-source-side heat exchanger and the main usage-side heat exchanger and the sub-usage-side heat exchanger, and a second main expansion mechanism that decompresses the main refrigerant that flows between the sub-usage-side heat exchanger and the other of the main heat-source-side heat exchanger and the main usage-side heat exchanger.

Here, as described above, the refrigeration cycle device not only has a structure that includes the main refrigerant circuit and the sub-refrigerant circuit and that is configured to, by causing the sub-usage-side heat exchanger to function as an evaporator or a radiator of the sub-refrigerant, cool or heat the main refrigerant that flows between the main heat-source-side heat exchanger and the main usage-side heat exchanger, but also has, at the main refrigerant circuit, the first main expansion mechanism and the second main expansion mechanism that decompress the main refrigerant on an upstream side and a downstream side of the sub-usage-side heat exchanger. Therefore, here, when either the cooling operation is performed or the heating operation is performed, it is possible to cause the main refrigerant at an intermediate pressure that has been decompressed by the first main expansion mechanism and that has not yet been decompressed by the second main expansion mechanism to flow to the sub-usage-side heat exchanger. Consequently, here, since, when performing the heating operation, in the sub-usage-side heat exchanger, the temperature difference with respect to the sub-refrigerant that exchanges heat with the main refrigerant is increased, the heating capacity of the main refrigerant at the sub-usage-side heat exchanger is increased and the enthalpy of the main refrigerant that is sent to the main heat-source-side heat exchanger is easily increased. Thus, it is possible to decrease the heat-exchange amount that is required to evaporate the main refrigerant in the main heat-source-side heat exchanger.

In this way, here, the refrigeration cycle device that includes the main refrigerant circuit and the sub-refrigerant circuit and that is configured to, by causing the sub-usage-side heat exchanger to function as a radiator of the sub-refrigerant, heat the main refrigerant that flows between the main heat-source-side heat exchanger and the main usage-side heat exchanger is capable of decreasing the heat-exchange amount that is required to evaporate the main refrigerant at the main heat-source-side heat exchanger when performing the heating operation.

A refrigeration cycle device according to a second aspect is the refrigeration cycle device according to the first aspect, in which, when the main flow-path switching mechanism is in the main cooling operation state, the first main expansion mechanism decompresses the main refrigerant that flows between the main heat-source-side heat exchanger and the sub-usage-side heat exchanger, and the second main expansion mechanism decompresses the main refrigerant that flows between the sub-usage-side heat exchanger and the main usage-side heat exchanger.

Here, when the main flow-path switching mechanism is in the main cooling operation state, it is possible to cause the main refrigerant to flow to the main heat-source-side heat exchanger, the first main expansion mechanism, the sub-usage-side heat exchanger, the second main expansion mechanism, and the main usage-side heat exchanger in this order.

A refrigeration cycle device according to a third aspect is the refrigeration cycle device according to the first aspect or the second aspect, in which the main compressor includes a low-stage-side compression element that compresses the main refrigerant and a high-stage-side compression element that compresses the main refrigerant discharged from the low-stage-side compression element. The main refrigerant circuit has an intermediate heat exchanger that, when the main flow-path switching mechanism is in the main cooling operation state, functions as a cooler of the main refrigerant that flows between the low-stage-side compression element and the high-stage-side compression element, and, when the main flow-path switching mechanism is in the main heating operation state, functions as an evaporator of the main refrigerant that has been heated at the sub-usage-side heat exchanger.

Here, as described above, when the main flow-path switching mechanism is in the main cooling operation state, the intermediate heat exchanger is capable of cooling the main refrigerant at an intermediate pressure that flows between the low-stage-side compression element and the high-stage-side compression element. Therefore, it is possible to keep low the temperature of the main refrigerant at a high pressure that is discharged from the main compressor. Moreover, here, as described above, when the main flow-path switching mechanism is in the main heating operation state, the intermediate heat exchanger is capable of evaporating the main refrigerant that has been heated at the sub-usage-side heat exchanger. Therefore, it is possible to increase the evaporation capacity compared with that when the main refrigerant that has been heated at the sub-usage-side heat exchanger is evaporated by only the main heat-source-side heat exchanger.

A refrigeration cycle device according to a fourth aspect is the refrigeration cycle device according to any one of the first aspect to the third aspect, in which, when the main flow-path switching mechanism is in the main heating operation state, the first main expansion mechanism decompresses the main refrigerant that flows between the main usage-side heat exchanger and the sub-usage-side heat exchanger, and the second main expansion mechanism decompresses the main refrigerant that flows between the sub-usage-side heat exchanger and the main heat-source-side heat exchanger.

Here, when the main flow-path switching mechanism is in the main heating operation state, it is possible to cause the main refrigerant to flow to the main usage-side heat exchanger, the first main expansion mechanism, the sub-usage-side heat exchanger, the second main expansion mechanism, and the main heat-source-side heat exchanger in this order.

A refrigeration cycle device according to a fifth aspect is the refrigeration cycle device according to the third aspect, in which the main refrigerant circuit has an intermediate heat-exchange bypass pipe that, when the main flow-path switching mechanism is in the main heating operation state, causes the main refrigerant that has been discharged from the low-stage-side compression element to bypass the intermediate heat exchanger and to be sent to the high-stage-side compression element, an intermediate heat-exchange feed pipe that causes the main refrigerant that flows between the sub-usage-side heat exchanger and the main heat-source-side heat exchanger to branch off and to be sent to the intermediate heat exchanger, and an intermediate heat-exchange return pipe that causes the main refrigerant to return to a suction side of the main compressor from the intermediate heat exchanger.

Here, when the main flow-path switching mechanism is in the main heating operation state, the main refrigerant at the intermediate pressure that flows between the low-stage-side compression element and the high-stage-side compression element is sent to the high-stage-side compression element by bypassing the intermediate heat exchanger by using the intermediate heat-exchange bypass pipe, and a part of the main refrigerant that has been heated at the sub-usage-side heat exchanger can be evaporated at the intermediate heat exchanger and can be returned to the suction side of the main compressor by using the intermediate heat-exchange feed pipe and the intermediate heat-exchange return pipe. That is, here, when the main flow-path switching mechanism is in the main heating operation state, the intermediate heat exchanger is capable of being caused to function as an evaporator of the main refrigerant that is in parallel with the main heat-source-side heat exchanger.

A refrigeration cycle device according to a sixth aspect is the refrigeration cycle device according to the fifth aspect, in which, when the main flow-path switching mechanism is in the main heating operation state, the first main expansion mechanism decompresses the main refrigerant that flows between the main usage-side heat exchanger and the sub-usage-side heat exchanger, and the second main expansion mechanism decompresses the main refrigerant that flows between the sub-usage-side heat exchanger and the main heat-source-side heat exchanger. The main refrigerant circuit has a third main expansion mechanism that decompresses the main refrigerant that flows in the intermediate heat-exchange feed pipe.

Here, when the main flow-path switching mechanism is in the main heating operation state, it is possible to cause the main refrigerant to flow to the main usage-side heat exchanger, the first main expansion mechanism, and the sub-usage-side heat exchanger in this order, to thereafter branch off in two, to flow to the second main expansion mechanism and the main heat-source-side heat exchanger in this order, and to flow to the third main expansion mechanism and the intermediate heat exchanger in this order.

A refrigeration cycle device according to a seventh aspect is the refrigeration cycle device according to any one of the first aspect to the sixth aspect, in which the main refrigerant is carbon dioxide, and in which the sub-refrigerant is a HFC refrigerant, a HFO refrigerant, or a mixture refrigerant in which the HFC refrigerant and the HFO refrigerant are mixed. Each of the HFC refrigerant, the HFO refrigerant, and the mixture refrigerant has a GWP that is 750 or less.

Here, as described above, since, in addition to the main refrigerant and the sub-refrigerant, a refrigerant having a low GWP is used, it is possible to reduce environmental load, such as global warming.

A refrigeration cycle device according to an eighth aspect is the refrigeration cycle device according to any one of the first aspect to the sixth aspect, in which the main refrigerant is carbon dioxide, and in which the sub-refrigerant is a natural refrigerant having a coefficient of performance that is higher than a coefficient of performance of the carbon dioxide.

Here, as described above, since, as the sub-refrigerant, a natural refrigerant having a coefficient of performance that is higher than that of carbon dioxide is used, it is possible to reduce environmental load, such as global warming.

DESCRIPTION OF EMBODIMENTS

A refrigeration cycle device is described below based on the drawings.

(1) Configuration

Figure 1:
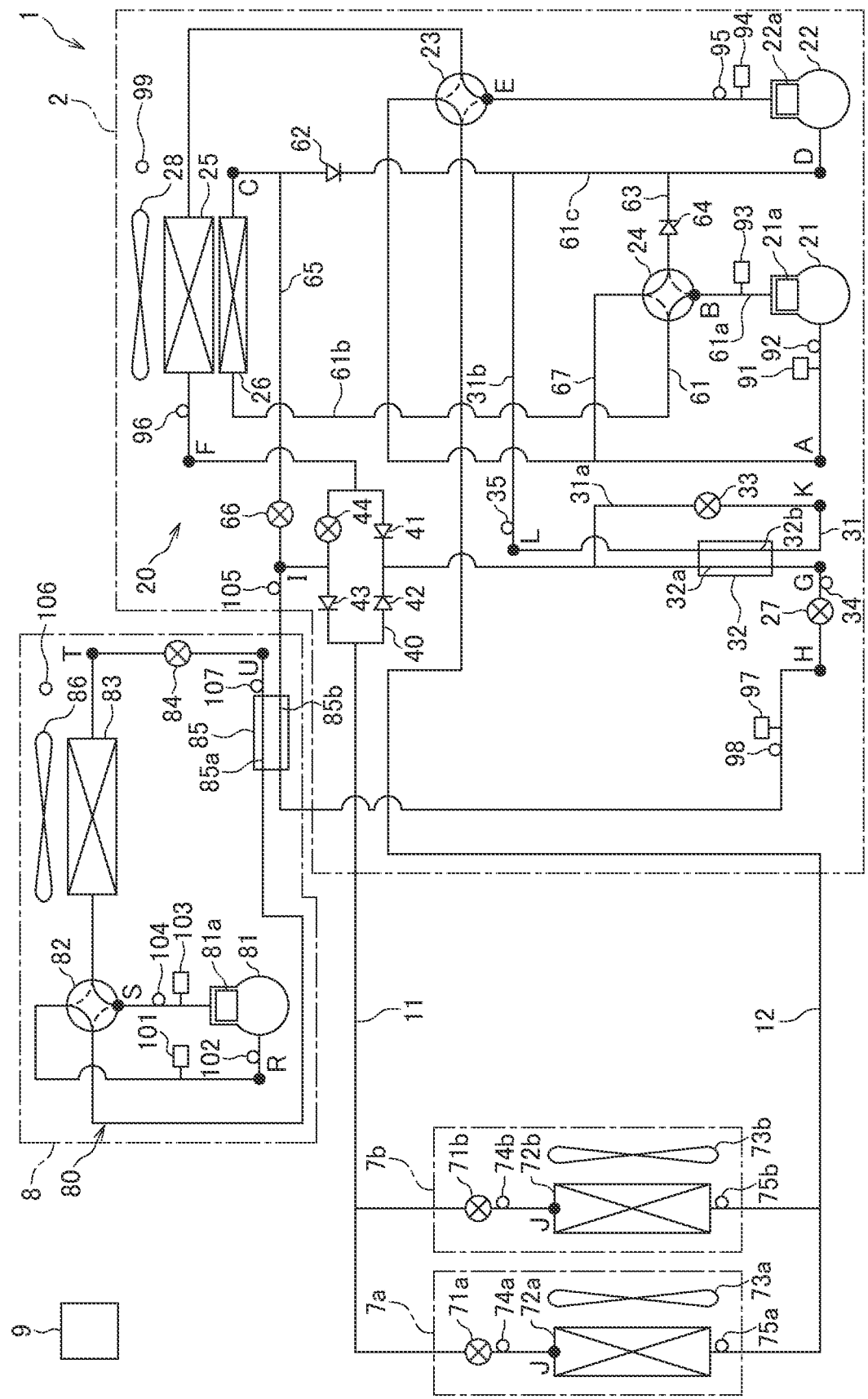
FIG. 1 is a schematic view of a configuration of a refrigeration cycle device according to an embodiment of the present disclosure.

FIG. 1 is a schematic view of a configuration of a refrigeration cycle device 1 according to an embodiment of the present disclosure.

<Circuit Configuration>

The refrigeration cycle device 1 includes a main refrigerant circuit 20 in which a main refrigerant circulates and a sub-refrigerant circuit 80 in which a sub-refrigerant circulates, and is a device that air-conditions (here, cools and heats) the interior of a room.

Main Refrigerant Circuit

The main refrigerant circuit 20 primarily has main compressors 21 and 22, a main heat-source-side heat exchanger 25, main usage-side heat exchangers 72a and 72b, a sub-usage-side heat exchanger 85, and a first main flow-path switching mechanism 23. The main refrigerant circuit 20 has an intermediate refrigerant pipe 61, a second main flow-path switching mechanism 24, an intermediate heat exchanger 26, an intermediate heat-exchange bypass pipe 63, a bridge circuit 40, an intermediate injection pipe 31, an economizer heat exchanger 32, an upstream-side main expansion mechanism 27, main usage-side expansion mechanisms 71a and 71b, an intermediate heat-exchange feed pipe 65, and an intermediate heat-exchange return pipe 67. As the main refrigerant, carbon dioxide is sealed in the main refrigerant circuit 20.

The main compressors 21 and 22 are devices that compress the main refrigerant. The first main compressor 21 is a compressor in which a low-stage-side compression element 21a, such as a rotary type or a scroll type, is driven by a driving mechanism, such as a motor or an engine. The second main compressor 22 is a compressor in which a high-stage-side compression element 22a, such as a rotary type or a scroll type, is driven by a driving mechanism, such as a motor or an engine. The main compressors 21 and 22 constitute a multi-stage compressor (here, a two-stage compressor) in which the first main compressor 21 on the low-stage side compresses and then discharges the main refrigerant, and in which the second main compressor 22 on the high-stage side compresses the main refrigerant discharged from the first main compressor 21. Here, a discharge side of the first main compressor 21 (low-stage-side compression element 21a) and a suction side of the second main compressor 22 (high-stage-side compression element 22a) are connected by the intermediate refrigerant pipe 61.

The first main flow-path switching mechanism 23 is a mechanism for switching a direction of flow of the main refrigerant in the main refrigerant circuit 20. The first main flow-path switching mechanism 23 is a switching mechanism that switches between a main cooling operation state, in which the main refrigerant is caused to circulate so that the main usage-side heat exchangers 72a and 72b function as evaporators of the main refrigerant, and a main heating operation state, in which the main refrigerant is caused to circulate so that the main usage-side heat exchangers 72a and 72b function as radiators of the main refrigerant. Specifically, the first main flow-path switching mechanism 23 is a four-way switching valve, and, here, is connected to the suction side of the main compressor 21 or 22 (here, the suction side of the first main compressor 21), a discharge side of the main compressor 21 or 22 (here, the discharge side of the second main compressor 22), one end of the main heat-source-side heat exchanger 25, and the other ends of the main usage-side heat exchangers 72a and 72b. In addition, in the main cooling operation state, the first main flow-path switching mechanism 23 connects the discharge side of the second main compressor 22 and the one end of the main heat-source-side heat exchanger 25, and connects the suction side of the first main compressor 21 and the other ends of the main usage-side heat exchangers 72a and 72b (refer to a solid line of the first main flow-path switching mechanism 23 in FIG. 1). In addition, in the main heating operation state, the first main flow-path switching mechanism 23 connects the discharge side of the second main compressor 22 and the other ends of the main usage-side heat exchangers 72a and 72b, and connects the suction side of the first main compressor 21 and the one end of the main heat-source-side heat exchanger 25 (refer to a broken line of the first main flow-path switching mechanism 23 in FIG. 1). Note that the first main flow-path switching mechanism 23 is not limited to a four-way switching valve, and, for example, may have the function of switching a direction of flow of the main refrigerant as described above by, for example, combining a plurality of two-way valves or three-way valves.

The main heat-source-side heat exchanger 25 is a device that causes the main refrigerant and outdoor air to exchange heat with each other, and, here, is a heat exchanger that functions as a radiator or an evaporator of the main refrigerant. The one end of the main heat-source-side heat exchanger 25 is connected to the first main flow-path switching mechanism 23, and the other end of the main heat-source-side heat exchanger 25 is connected to the bridge circuit 40. In addition, when the first main flow-path switching mechanism 23 is in the main cooling operation state, the main heat-source-side heat exchanger 25 functions as a radiator of the main refrigerant, and when the first main flow-path switching mechanism 23 is in the main heating operation state, the main heat-source-side heat exchanger 25 functions as an evaporator of the main refrigerant.

The bridge circuit 40 is provided between the main heat-source-side heat exchanger 25 and the main usage-side heat exchangers 72a and 72b. The bridge circuit 40 is a circuit that rectifies flow so that, when the first main flow-path switching mechanism 23 is in either the main cooling operation state or the main heating operation state, the main refrigerant that circulates in the main refrigerant circuit 20 flows in the economizer heat exchanger 32 (a first economizer flow path 32a), the upstream-side main expansion mechanism 27, and the sub-usage-side heat exchanger 85 (a second sub-flow-path 85b) in this order. Here, the bridge circuit 40 has three check mechanisms 41, 42, and 43, and a first downstream-side main expansion mechanism 44. Here, the inlet check mechanism 41 is a check valve that allows only flow of the main refrigerant to the economizer heat exchanger 32 and the upstream-side main expansion mechanism 27 from the main heat-source-side heat exchanger 25. The inlet check mechanism 42 is a check valve that allows only flow of the main refrigerant to the economizer heat exchanger 32 and the upstream-side main expansion mechanism 27 from the main usage-side heat exchangers 72a and 72b. The outlet check mechanism 43 is a check valve that allows only flow of the main refrigerant to the main usage-side heat exchangers 72a and 72b from the sub-usage-side heat exchanger 85. The first downstream-side main expansion mechanism 44 is a device that decompresses the main refrigerant, and, here, is an expansion mechanism that is fully closed when the first main flow-path switching mechanism 23 is in the main cooling operation state, and that decompresses the main refrigerant that is sent to the main heat-source-side heat exchanger 25 from the sub-usage-side heat exchanger 85 when the first main flow-path switching mechanism 23 is in the main heating operation state. That is, when the first main flow-path switching mechanism 23 is in the main heating operation state, the first downstream-side main expansion mechanism 44 functions as a second main expansion mechanism that decompresses the main refrigerant that flows between the sub-usage-side heat exchanger 85 and the main heat-source-side heat exchanger 25. The first downstream-side main expansion mechanism 44 is, for example, an electrically powered expansion valve.

The intermediate injection pipe 31 is a refrigerant pipe in which the main refrigerant flows, and, here, is a refrigerant pipe that causes the main refrigerant that flows between the main heat-source-side heat exchanger 25 and the main usage-side heat exchangers 72a and 72b to branch off and to be sent to the main compressors 21 and 22. Specifically, the intermediate injection pipe 31 is a refrigerant pipe that causes a main refrigerant that flows between the inlet check mechanisms 41 and 42 of the bridge circuit 40 and the upstream-side main expansion mechanism 27 to branch off and to be sent to the suction side of the second main compressor 22, and includes a first intermediate injection pipe 31a and a second intermediate injection pipe 31b. One end of the first intermediate injection pipe 31a is connected at a location between the inlet check mechanisms 41 and 42 of the bridge circuit 40 and the economizer heat exchanger 32 (one end of the first economizer flow path 32a), and the other end of the first intermediate injection pipe 31a is connected to the economizer heat exchanger 32 (one end of a second economizer flow path 32b). One end of the second intermediate injection pipe 31b is connected to the economizer heat exchanger 32 (the other end of the second economizer flow path 32b), and the other end of the second intermediate injection pipe 31b is connected at a location between an outlet of the intermediate heat exchanger 26 and the suction side of the second main compressor 22.

The intermediate injection pipe 31 has an intermediate injection expansion mechanism 33. The intermediate injection expansion mechanism 33 is provided at the first intermediate injection pipe 31a. The intermediate injection expansion mechanism 33 is a device that decompresses the main refrigerant, and, here, is an expansion mechanism that decompresses a main refrigerant that flows in the intermediate injection pipe 31. The intermediate injection expansion mechanism 33 is, for example, an electrically powered expansion valve.

The economizer heat exchanger 32 is a device that causes main refrigerants to exchange heat with each other, and, here, is a heat exchanger that cools a main refrigerant that flows between the main heat-source-side heat exchanger 25 and the main usage-side heat exchangers 72a and 72b by heat exchange with the main refrigerant that flows in the intermediate injection pipe 31. Specifically, the economizer heat exchanger 32 is a heat exchanger that cools the main refrigerant that flows between the inlet check mechanisms 41 and 42 of the bridge circuit 40 and the upstream-side main expansion mechanism 27 by heat exchange with the main refrigerant that flows in the intermediate injection pipe 31. The economizer heat exchanger 32 has the first economizer flow path 32a in which the main refrigerant that flows between the inlet check mechanisms 41 and 42 of the bridge circuit 40 and the upstream-side main expansion mechanism 27 is caused to flow, and the second economizer flow path 32b in which the main refrigerant that flows in the intermediate injection pipe 31 is caused to flow. The one end (inlet) of the first economizer flow path 32a is connected to the inlet check mechanisms 41 and 42 of the bridge circuit 40, and the other end (outlet) of the first economizer flow path 32a is connected to an inlet of the upstream-side main expansion mechanism 27. The one end (inlet) of the second economizer flow path 32b is connected to the other end of the first intermediate injection pipe 31a, and the other end (outlet) of the second economizer flow path 32b is connected to the one end of the second intermediate injection pipe 31b.

The upstream-side main expansion mechanism 27 is a device that decompresses the main refrigerant, and, here, is an expansion mechanism (first main expansion mechanism) that decompresses a main refrigerant that flows between the sub-usage-side heat exchanger 85 (the second sub-flow path 85b) and one of the main heat-source-side heat exchanger 25 and the main usage-side heat exchangers 72a and 72b. That is, when the main flow-path switching mechanism 23 is in the main cooling operation state, the upstream-side main expansion mechanism 27 decompresses the main refrigerant that flows between the main heat-source-side heat exchanger 25 and the sub-usage-side heat exchanger 85, and, when the main flow-path switching mechanism 23 is in the main heating operation state, the upstream-side main expansion mechanism 27 decompresses the main refrigerant that flows between the main usage-side heat exchangers 72a and 72b and the sub-usage-side heat exchanger 85. Specifically, the upstream-side main expansion mechanism 27 is provided between the inlet check mechanisms 41 and 42 of the bridge circuit 40 and the sub-usage-side heat exchanger 85 (the second sub-flow path 85b). The upstream-side main expansion mechanism 27 is, for example, an electrically powered expansion valve. Note that the upstream-side main expansion mechanism 27 may be an expander that causes power to be produced by decompressing the main refrigerant.

The sub-usage-side heat exchanger 85 is a device that causes the main refrigerant and the sub-refrigerant to exchange heat with each other, and, here, is a heat exchanger that functions as a cooler or a heater of the main refrigerant that flows between the main heat-source-side heat exchanger 25 and the main usage-side heat exchangers 72a and 72b. That is, when the first main flow-path switching mechanism 23 is in the main cooling operation state, the sub-usage-side heat exchanger 85 functions as a cooler of the main refrigerant that flows between the main heat-source-side heat exchanger 25 and the main usage-side heat exchangers 72a and 72b, and, when the first main flow-path switching mechanism 23 is in the main heating operation state, the sub-usage-side heat exchanger 85 functions as a heater of the main refrigerant that flows between the main heat-source-side heat exchanger 25 and the main usage-side heat exchangers 72a and 72b. Specifically, the sub-usage-side heat exchanger 85 is a heat exchanger that cools or heats a main refrigerant that flows between the upstream-side main expansion mechanism 27 and the third check mechanism 43 and the first downstream-side main expansion mechanism 44 of the bridge circuit 40.

The main usage-side expansion mechanisms 71a and 71b are each a device that decompresses the main refrigerant. Here, when the first main flow-path switching mechanism 23 is in the main cooling operation state, the main usage-side expansion mechanisms 71a and 71b function as expansion mechanisms (second main expansion mechanisms) that decompress the main refrigerant that flows between the sub-usage-side heat exchanger 85 and the main usage-side heat exchangers 72a and 72b. In addition, the main usage-side expansion mechanisms 71a and 71b are each an expansion mechanism that decompresses a main refrigerant that flows between the main usage-side heat exchangers 72a and 72b and the upstream-side main expansion mechanism 27 when the first main flow-path switching mechanism 23 is in the main heating operation state. Specifically, the main usage-side expansion mechanisms 71a and 71b are provided between the inlet check mechanism 42 and the outlet check mechanism 43 of the bridge circuit 40 and one ends of the corresponding main usage-side heat exchangers 72a and 72b. The main usage-side expansion mechanisms 71a and 71b are each, for example, an electrically powered expansion valve.

The main usage-side heat exchangers 72a and 72b are each a device that causes the main refrigerant and indoor air to exchange heat with each other, and, here, are each a heat exchanger that functions as an evaporator or a radiator of the main refrigerant. The one end of each of the main usage-side heat exchangers 72a and 72b is connected to a corresponding one of the main usage-side expansion mechanisms 71a and 71b, and the other end of each of the main usage-side heat exchangers 72a and 72b is connected to the suction side the first compressor 21.

The intermediate heat exchanger 26 is a device that causes the main refrigerant and outdoor air to exchange heat with each other, and, here, is a heat exchanger that functions as a cooler of a main refrigerant that flows between the first main compressor 21 and the second main compressor 22 when the first main flow-path switching mechanism 23 is in the main cooling operation state. In addition, the intermediate heat exchanger 26 is a heat exchanger that functions as an evaporator of a main refrigerant that has been heated at the sub-usage-side heat exchanger 85 (the second sub-flow path 85b) when the first main flow-path switching mechanism 23 is in the main heating operation state. The intermediate heat exchanger 26 is provided at the intermediate refrigerant pipe 61.

The intermediate refrigerant pipe 61 includes a first intermediate refrigerant pipe 61a, a second intermediate refrigerant pipe 61b, and a third intermediate refrigerant pipe 61c. One end of the first intermediate refrigerant pipe 61a is connected to the discharge side of the first main compressor 21 (the low-stage-side compression element 21a), and the other end of the first intermediate refrigerant pipe 61a is connected to the second main flow-path switching mechanism 24. One end of the second intermediate refrigerant pipe 61*b* is connected to the second main flow-path switching mechanism 24, and the other end of the second intermediate refrigerant pipe 61*b* is connected to one end of the intermediate heat exchanger 26. One end of the third intermediate refrigerant pipe 61*c* is connected to the other end of the intermediate heat exchanger 26, and the other end of the third intermediate refrigerant pipe 61*c* is connected to the suction side of the second main compressor 22 (the high-stage-side compression element 22*a*). A check mechanism 62, which is a check valve that allows only flow of the main refrigerant to the suction side of the second main compressor 22 (the high-stage-side compression element 22*a*) from the other end of the intermediate heat exchanger 26, is provided at the third intermediate refrigerant pipe 61*c*. The other end of the second intermediate injection pipe 31*b* is connected to a portion of the third intermediate refrigerant pipe 61*c* that is situated between the check mechanism 62 and the suction side of the second main compressor 22 (the high-stage-side compression element 22*a*).

The intermediate heat-exchange bypass pipe 63 is a refrigerant pipe that causes the main refrigerant that has been discharged from the first main compressor 21 (the low-stage-side compression element 21*a*) to bypass the intermediate heat exchanger 26 and to be sent to the second main compressor 22 (the high-stage-side compression element 22*a*) when the first main flow-path switching mechanism 23 is in the main heating operation state. One end of the intermediate heat-exchange bypass pipe 63 is connected to the second main flow-path switching mechanism 24, and the other end of the intermediate heat-exchange bypass pipe 63 is connected to a portion of the third intermediate refrigerant pipe 61*c* that is situated between the check mechanism 62 and the suction side of the second main compressor 22 (the high-stage-side compression element 22*a*). A check mechanism 64, which is a check valve that allows only flow of the main refrigerant to the third intermediate refrigerant pipe 61*c* from the second main flow-path switching mechanism 24, is provided at the intermediate heat-exchange bypass pipe 63.

The second main flow-path switching mechanism 24 is a mechanism for switching a direction of flow of the main refrigerant in the main refrigerant circuit 20. The second main flow-path switching mechanism 24 is a switching mechanism that switches between an intermediate heat-exchange heat dissipation state, in which the main refrigerant that has been discharged from the first main compressor 21 is passed through the intermediate heat exchanger 26 and then is sent to the second main compressor 22, and an intermediate heat-exchange bypass state, in which the main refrigerant that has been discharged from the first main compressor 21 is sent to the second main compressor 22 without passing through the intermediate heat exchanger 26. Specifically, the second main flow-path switching mechanism 24 is a four-way switching valve, and is connected to the discharge side of the first main compressor 21, the one end of the second intermediate refrigerant pipe 61*b*, and the one end of the intermediate heat-exchange bypass pipe 63. In addition, in the intermediate heat-exchange heat dissipation state, the second main flow-path switching mechanism 24 connects the discharge side of the first main compressor 21 and the suction side of the second main compressor 22 via the intermediate heat exchanger 26 (refer to a solid line of the second main flow-path switching mechanism 24 in FIG. 1). In the intermediate heat-exchange bypass state, the second main flow-path switching mechanism 24 connects the discharge side of the first main compressor 21 and the suction side of the second main compressor 22 via the intermediate heat-exchange bypass pipe 64 (refer to a broken line of the second main flow-path switching mechanism 24 in FIG. 1). Note that the second main flow-path switching mechanism 24 is not limited to a four-way switching valve, and, for example, may have the function of switching a direction of flow of the main refrigerant as described above by, for example, combining a plurality of two-way valves or three-way valves.

The intermediate heat-exchange feed pipe 65 is a refrigerant pipe that causes the main refrigerant that flows between the sub-usage-side heat exchanger 85 (the second sub-flow path 85*b*) and the main heat-source-side heat exchanger 25 to branch off and to be sent to the intermediate heat exchanger 26 when the first main flow-path switching mechanism 23 is in the main heating operation state. Specifically, one end of the intermediate heat-exchange feed pipe 65 is connected at a location between the sub-usage-side heat exchanger 85 and the third check mechanism 43 and the first downstream-side main expansion mechanism 44 of the bridge circuit 40, and the other end of the intermediate heat-exchange feed pipe 65 is connected to a portion of the third intermediate refrigerant pipe 61*c* that is situated between the other end of the intermediate heat exchanger 26 and the check mechanism 62.

In addition, the intermediate heat-exchange feed pipe 65 has a second downstream-side main expansion mechanism 66. The second downstream-side main expansion mechanism 66 is a device that decompresses the main refrigerant, and, here, is an expansion mechanism that is fully closed when the first main flow-path switching mechanism 23 is in the main cooling operation state, and that decompresses the main refrigerant that is sent to the intermediate heat exchanger 26 from the sub-usage-side heat exchanger 85 when the first main flow-path switching mechanism 23 is in the main heating operation state and the second main flow-path switching mechanism 24 is in the intermediate heat-exchange bypass state. That is, when the first main flow-path switching mechanism 23 is in the main heating operation state and the second main flow-path switching mechanism 24 is in the intermediate heat-exchange bypass state, the second downstream-side main expansion mechanism 66 functions as a third main expansion mechanism that decompresses a main refrigerant that flows in the intermediate heat-exchange feed pipe 65. The second downstream-side main expansion mechanism 66 is, for example, an electrically powered expansion valve.

The intermediate heat-exchange return pipe 67 is a refrigerant pipe that returns the main refrigerant to the suction side of the main compressor 21 and 22 from the intermediate heat exchanger 26 when the first main flow-path switching mechanism 23 is in the main heating operation state. Specifically, one end of the intermediate heat-exchange return pipe 67 is connected to the second main flow-path switching mechanism 24, and the other end of the intermediate heat-exchange return pipe 67 is connected to the suction side of the first compressor 21.

In addition, in the main refrigerant circuit 20, when the first main flow-path switching mechanism 23 is in the main cooling operation state and the second main flow-path switching mechanism 24 is in the intermediate heat-exchange heat dissipation state, the main refrigerant that has been discharged from the first main compressor 21 can flow so as to be sucked into the second main compressor 22 after being cooled at the intermediate heat exchanger 26. In addition, in the main refrigerant circuit 20, when the first main flow-path switching mechanism 23 is in the main heating operation state and the second main flow-path switching mechanism 24 is in the intermediate heat-exchange bypass state, the main refrigerant that has been discharged from the first main compressor 21 can flow so as to bypass the intermediate heat exchanger 26 via the intermediate heat-exchange bypass pipe 63 and to be sucked into the second main compressor 22. Moreover, when the first main flow-path switching mechanism 23 is in the main heating operation state and the second main flow-path switching mechanism 24 is in the intermediate heat-exchange bypass state, a portion of the main refrigerant that is sent to the main heat-source-side heat exchanger 25 from the sub-usage-side heat exchanger 85 can be caused to flow so that, after branching off into the intermediate heat-exchange feed pipe 65 and being evaporated at the intermediate heat exchanger 26, it returns to the suction side of the first main compressor via the intermediate heat-exchange return pipe 67.

Sub-Refrigerant Circuit

The sub-refrigerant circuit 80 primarily has a sub-compressor 81, a sub-heat-source-side heat exchanger 83, the sub-usage-side heat exchanger 85, and a sub-flow-path switching mechanism 82. The sub-refrigerant circuit 80 has a sub-expansion mechanism 84. As the sub-refrigerant, a HFC refrigerant (such as R32), a HFO refrigerant (such as R1234yf or R1234ze), or a mixture refrigerant in which the HFC refrigerant and the HFO refrigerant are mixed (such as R452B) is sealed in the sub-refrigerant circuit 80. Each of the HFC refrigerant, the HFO refrigerant, and the mixture refrigerant having a GWP (global warming potential) is 750 or less. Note that the sub-refrigerant is not limited thereto, and may be a natural refrigerant having a coefficient of performance that is higher than that of carbon dioxide (such as propane or ammonia).

The sub-compressor 81 is a device that compresses the sub-refrigerant. The sub-compressor 81 is a compressor in which a compression element 81a, such as a rotary type or a scroll type, is driven by a driving mechanism, such as a motor or an engine.

The sub-flow-path switching mechanism 82 is a mechanism for switching a direction of flow of the sub-refrigerant in the sub-refrigerant circuit 80. The sub-flow-path switching mechanism 82 is a switching mechanism that switches between a sub-cooling operation state, in which the sub-refrigerant is caused to circulate so that the sub-usage-side heat exchanger 85 functions as an evaporator of the sub-refrigerant, and a sub-heating operation state, in which the sub-refrigerant is caused to circulate so that the sub-usage-side heat exchanger 85 functions as a radiator of the sub-refrigerant. Specifically, the sub-flow-path switching mechanism 82 is a four-way switching valve, and is connected to a suction side of the sub-compressor 81, a discharge side of the sub-compressor 81, one end of the sub-heat-source-side heat exchanger 83, and the other end of the sub-usage-side heat exchanger 85 (a first sub-flow path 85a). In addition, in the sub-cooling operation state, the sub-flow-path switching mechanism 82 connects the discharge side of the sub-compressor 81 and the one end of the sub-heat-source-side heat exchanger 83, and connects the suction side of the sub-compressor 81 and the other end of the sub-usage-side heat exchanger 85 (the first sub-flow path 85a) (refer to a solid line of the sub-flow-path switching mechanism 82 in FIG. 1). In addition, in the sub-heating operation state, the sub-flow-path switching mechanism 82 connects the discharge side of the sub-compressor 81 and the other end of the sub-usage-side heat exchanger 85 (the first sub-flow path 85a), and connects the suction side of the sub-compressor 81 and the one end of the sub-heat-source-side heat exchanger 83 (refer to a broken line of the sub-flow-path switching mechanism 82 in FIG. 1). Note that the sub-flow-path switching mechanism 82 is not limited to a four-way switching valve, and, for example, may have the function of switching a direction of flow of the sub-refrigerant as described above by, for example, combining a plurality of two-way valves or three-way valves.

The sub-heat-source-side heat exchanger 83 is a device that causes the sub-refrigerant and outdoor air to exchange heat with each other, and, here, is a heat exchanger that functions as a radiator or an evaporator of the sub-refrigerant. The one end of the sub-heat-source-side heat exchanger 83 is connected to the sub-flow-path switching mechanism 82, and the other end of the sub-heat-source-side heat exchanger 83 is connected to the sub-expansion mechanism 84. In addition, when the sub-flow-path switching mechanism 82 is in the sub-cooling operation state, the sub-heat-source-side heat exchanger 83 functions as a radiator of the sub-refrigerant, and when the sub-flow-path switching mechanism 82 is in the sub-heating operation state, the sub-heat-source-side heat exchanger 83 functions as an evaporator of the sub-refrigerant.

The sub-expansion mechanism 84 is a device that decompresses the sub-refrigerant, and, here, is an expansion mechanism that decompresses a sub-refrigerant that flows between the sub-heat-source-side heat exchanger 83 and the sub-usage-side heat exchanger 85. Specifically, the sub-expansion mechanism 84 is provided between the other end of the sub-heat-source-side heat exchanger 83 and the sub-usage-side heat exchanger 85 (one end of the first sub-flow path 85a). The sub-expansion mechanism 84 is, for example, an electrically powered expansion valve.

The sub-usage-side heat exchanger 85 is, as described above, a device that causes the main refrigerant and the sub-refrigerant to exchange heat with each other, and, here, is a heat exchanger that functions as an evaporator of the sub-refrigerant and cools the main refrigerant that flows between the main heat-source-side heat exchanger 25 and the main usage-side heat exchangers 72a and 72b, or functions as a radiator of the sub-refrigerant and heats the main refrigerant that flows between the main usage-side heat exchangers 72a and 72b and the main heat-source-side heat exchanger 25. Specifically, the sub-usage-side heat exchanger 85 is a heat exchanger that cools or heats a main refrigerant that flows between the upstream-side main expansion mechanism 27 and the third check mechanism 43 and the first downstream-side main expansion mechanism 44 of the bridge circuit 40 with a refrigerant that flows in the sub-refrigerant circuit 80. The sub-usage-side heat exchanger 85 has the first sub-flow path 85a in which the sub-refrigerant that flows between the sub-expansion mechanism 84 and the sub-flow-path switching mechanism 82 is caused to flow, and the second sub-flow path 85b in which the main refrigerant that flows between the upstream-side main expansion mechanism 27 and the third check mechanism 43 and the first downstream-side main expansion mechanism 44 of the bridge circuit 40 is caused to flow. The one end of the first sub-flow path 85a is connected to the sub-expansion mechanism 84, and the other end of the first sub-flow path 85a is connected to the sub-flow-path switching mechanism 82. One end (inlet) of the second sub-flow path 85b is connected to the upstream-side main expansion mechanism 27, and the other end (outlet) of the second sub-flow path 85b is connected to the third check mechanism 43 and the first downstream-side main expansion mechanism 44 of the bridge circuit 40.

<Unit Configuration>

The constituent devices of the main refrigerant circuit 20 and the sub-refrigerant circuit 80 above are provided at a heat-source unit 2, a plurality of use units 7a and 7b, and a sub-unit 8. The use units 7a and 7b are each provided in correspondence with a corresponding one of the main usage-side heat exchangers 72a and 72b.

Heat-Source Unit

The heat-source unit 2 is disposed outdoors. The main refrigerant circuit 20 excluding the sub-usage-side heat exchanger 85, the main usage-side expansion mechanisms 71a and 71b, and the main usage-side heat exchangers 72a and 72b is provided at the heat-source unit 2.

A heat-source-side fan 28 for sending outdoor air to the main heat-source-side heat exchanger 25 and the intermediate heat exchanger 26 is provided at the heat-source unit 2. The heat-source-side fan 28 is a fan in which a blowing element, such as a propeller fan, is driven by a driving mechanism, such as a motor.

The heat-source unit 2 is provided with various sensors. Specifically, a pressure sensor 91 and a temperature sensor 92 that detect the pressure and the temperature of a main refrigerant on the suction side of the first main compressor 21 are provided. A pressure sensor 93 that detects the pressure of a main refrigerant on the discharge side of the first main compressor 21 is provided. A pressure sensor 94 and a temperature sensor 95 that detect the pressure and the temperature of a main refrigerant on the discharge side of the second main compressor 21 are provided. A temperature sensor 96 that detects the temperature of a main refrigerant on the other end side of the main heat-source-side heat exchanger 25 is provided. A temperature sensor 34 that detects the temperature of a main refrigerant on the other end side of the economizer heat exchanger 32 (the other end of the first economizer flow path 32a) is provided. A temperature sensor 35 that detects the temperature of a main refrigerant at the second intermediate injection pipe 31b is provided. A pressure sensor 97 and a temperature sensor 98 that detect the pressure and the temperature of a main refrigerant between the upstream-side main expansion mechanism 27 and the sub-usage-side heat exchanger 85 are provided. A temperature sensor 105 that detects the temperature of a main refrigerant on the other end side of the sub-usage-side heat exchanger 85 (the other end of the second sub-flow path 85b) is provided. A temperature sensor 99 that detects the temperature of outdoor air (outside air temperature) is provided.

Use Units

The use units 7a and 7b are disposed indoors. The main usage-side expansion mechanisms 71a and 71b and the main usage-side heat exchangers 72a and 72b of the main refrigerant circuit 20 are provided at a corresponding one of the use units 7a and 7b.

Usage-side fans 73a and 73b for sending indoor air to a corresponding one of the main usage-side heat exchangers 72a and 72b are provided at a corresponding one of the use units 7a and 7b. Each of the usage-side fans 73a and 73b is a fan in which a blowing element, such as a centrifugal fan or a multiblade fan, is driven by a driving mechanism, such as a motor.

The use units 7a and 7b are provided with various sensors. Specifically, temperature sensors 74a and 74b that detect the temperature of a main refrigerant on one end side of a corresponding one of the main usage-side heat exchangers 72a and 72b, and temperature sensors 75a and 75b that detect the temperature of a main refrigerant on the other end side of a corresponding one of the main usage-side heat exchangers 72a and 72b are provided.

Sub-Unit

The sub-unit 8 is disposed outdoors. The sub-refrigerant circuit 80 and a part of a refrigerant pipe that constitutes the main refrigerant circuit 20 (a part of the refrigerant pipe that is connected to the sub-usage-side heat exchanger 85 and in which the main refrigerant flows) are provided at the sub-unit 8.

A sub-side fan 86 for sending outdoor air to the sub-heat-source-side heat exchanger 83 is provided at the sub-unit 8. The sub-side fan 86 is a fan in which a blowing element, such as a propeller fan, is driven by a driving mechanism, such as a motor.

Here, although the sub-unit 8 is provided adjacent to the heat-source unit 2 and the sub-unit 8 and the heat-source unit 2 are substantially integrated with each other, it is not limited thereto. The sub-unit 8 may be provided apart from the heat-source unit 2, or all constituent devices of the sub-unit 8 may be provided at the heat-source unit 2 and the sub-unit 8 may be omitted.

The sub-unit 8 is provided with various sensors. Specifically, a pressure sensor 101 and a temperature sensor 102 that detect the pressure and the temperature of a sub-refrigerant on the suction side of the sub-compressor 81 are provided. A pressure sensor 103 and a temperature sensor 104 that detect the pressure and the temperature of a sub-refrigerant on the discharge side of the sub-compressor 81 are provided. A temperature sensor 106 that detects the temperature of outdoor air (outside air temperature) is provided. A temperature sensor 107 that detects the temperature of a sub-refrigerant on one end side of the sub-usage-side heat exchanger 85 (the one end of the first sub-flow path 85a) is provided.

Main Refrigerant Connection Pipes

The heat-source unit 2 and the use units 7a and 7b are connected to each other by main refrigerant connection pipes 11 and 12 that constitute a part of the main refrigerant circuit 20.

The first main refrigerant connection pipe 11 is a part of a pipe that connects the inlet check mechanism 42 and the outlet check mechanism 43 of the bridge circuit 40 and the main usage-side expansion mechanisms 71a and 71b.

The second main refrigerant connection pipe 12 is a part of a pipe that connects the other ends of the corresponding main usage-side heat exchangers 72a and 72b and the first main flow-path switching mechanism 23.

Control Unit

The constituent devices of the heat-source unit 2, the use units 7a and 7b, and the sub-unit 8, including the constituent devices of the main refrigerant circuit 20 and the sub-refrigerant circuit 80 above, are controlled by a control unit 9. The control unit 9 is formed by communication-connection of, for example, a control board provided at the heat-source unit 2, the use units 7a and 7b, and the sub-unit 8, and is formed so as to be capable of receiving, for example, detection signals of the various sensors 34, 35, 74a, 74b, 75a, 75b, 91 to 99, and 101 to 107. Note that, for convenience sake, FIG. 1 illustrates the control unit 9 at a position situated away from, for example, the heat-source unit 2, the use units 7a and 7b, and the sub-unit 8. In this way, the control unit 9, based on, for example, the detection signals of, for example, the various sensors 34, 35, 74a, 74b, 75a, 75b, 91 to 99, and 101 to 107, controls the constituent devices 21 to 24, 27, 28, 33, 44, 66, 71a, 71b, 73a, 73b, 81, 82, 84, and 86 of the refrigeration cycle device 1, that is, controls the operation of the entire refrigeration cycle device 1.

(2) Operation

Figure 2:
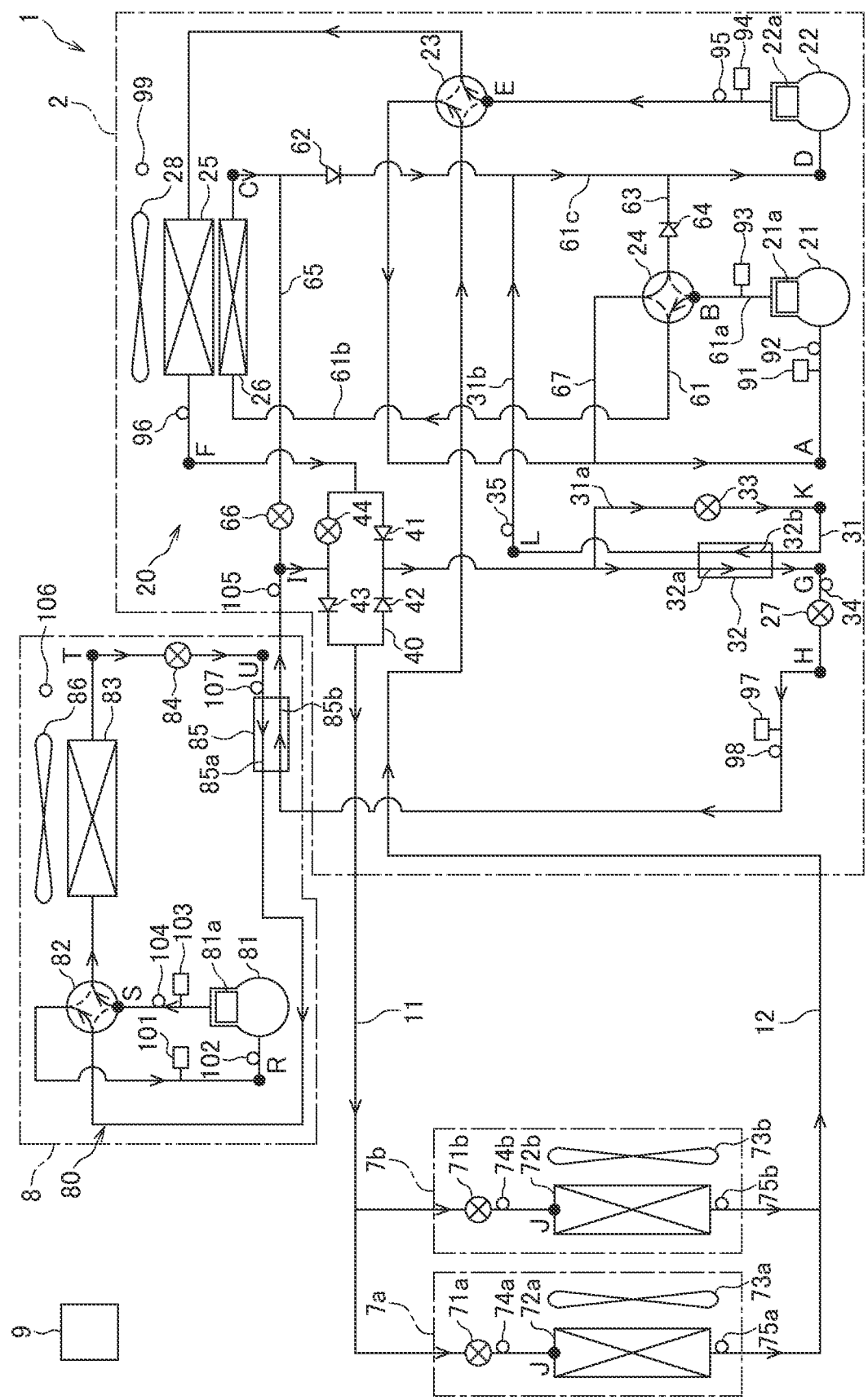
FIG. 2 illustrates flow of a refrigerant in the refrigeration cycle device in a cooling operation.
Figure 3:
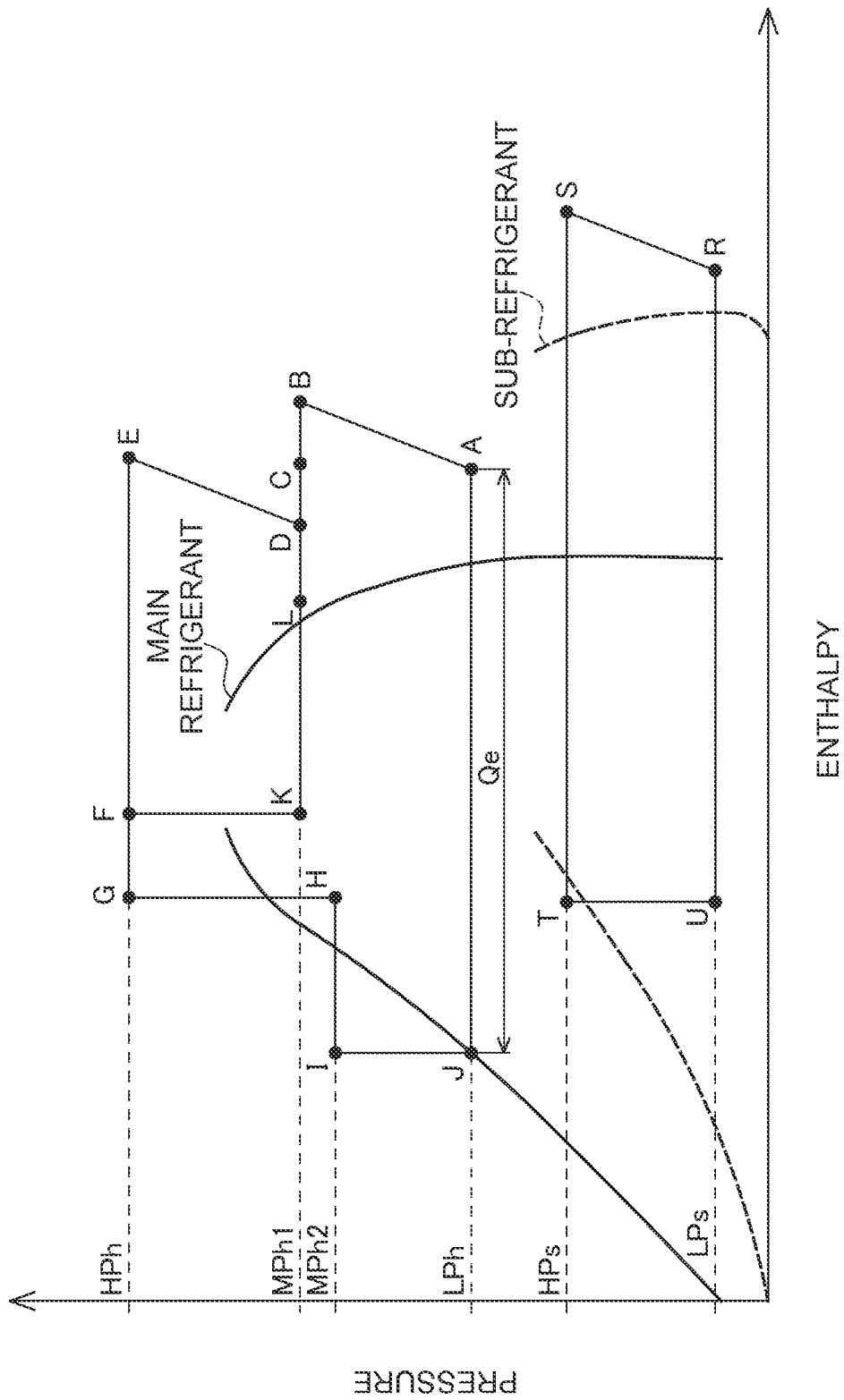
FIG. 3 is a pressure-enthalpy diagram illustrating a refrigeration cycle at the time of the cooling operation.
Figure 4:
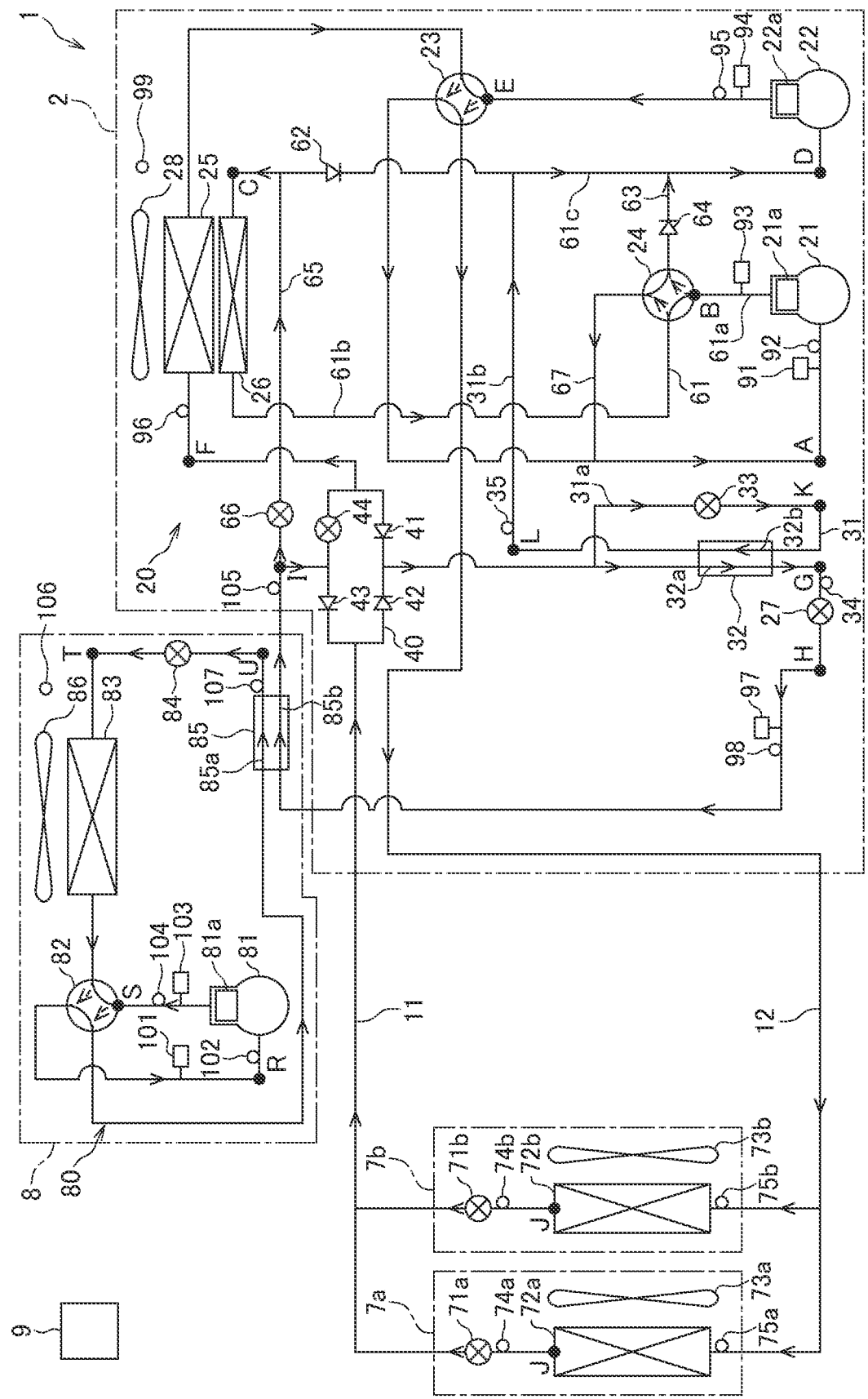
FIG. 4 illustrates flow of a refrigerant in the refrigeration cycle device in a heating operation.
Figure 5:
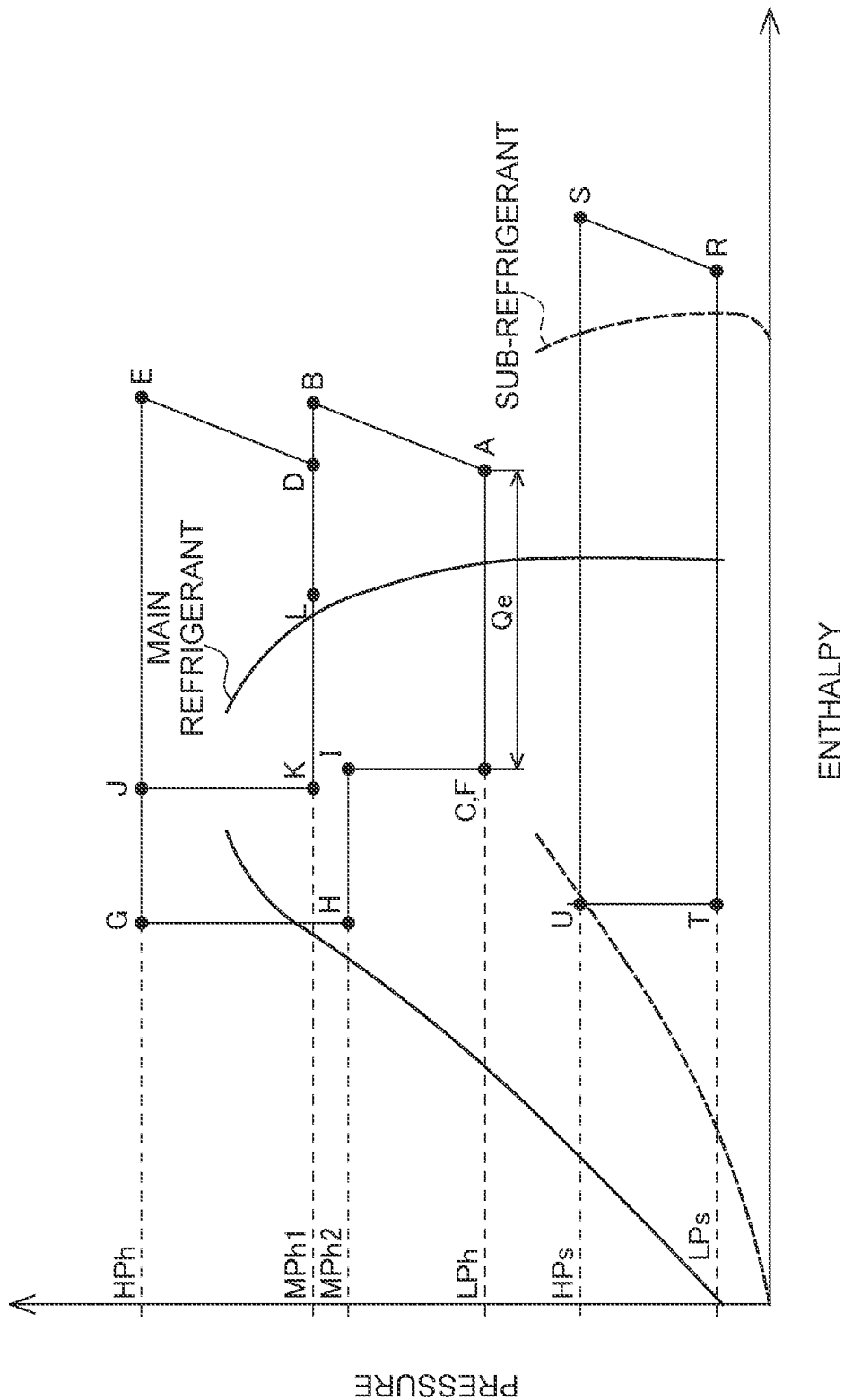
FIG. 5 is a pressure-enthalpy diagram illustrating a refrigeration cycle at the time of the heating operation.

Next, the operation of the refrigeration cycle device 1 is described by using FIGS. 2 to 5. Here, FIG. 2 illustrates flow of a refrigerant in the refrigeration cycle device 1 in a cooling operation. FIG. 3 is a pressure-enthalpy diagram illustrating a refrigeration cycle at the time of the cooling operation. FIG. 4 illustrates flow of a refrigerant in the refrigeration cycle device 1 in a heating operation. FIG. 5 is a pressure-enthalpy diagram illustrating a refrigeration cycle at the time of the heating operation.

The refrigeration cycle device 1 is capable of performing, in air-conditioning the interior of a room, a cooling operation that cools indoor air by causing the main usage-side heat exchangers 72a and 72b to function as evaporators of the main refrigerant and a heating operation that heats the indoor air by causing the main usage-side heat exchangers 72a and 72b to function as radiators of the main refrigerant. Here, at the time of the cooling operation, a sub-refrigerant-circuit cooling action that cools the main refrigerant by using the sub-refrigerant circuit 80 is performed, and, at the time of the heating operation, a sub-refrigerant-circuit heating action that heats the main refrigerant by using the sub-refrigerant circuit 80 is performed. Note that operations for the cooling operation accompanying the sub-refrigerant-circuit cooling action and for the heating operation accompanying the sub-refrigerant-circuit heating action are performed by the control unit 9.

<Cooling Operation Accompanying Sub-Refrigerant-Circuit Cooling Action>

At the time of the cooling operation, the first main flow-path switching mechanism 23 switches to the main cooling operation state shown by a solid line in FIG. 2, and the second main flow-path switching mechanism 24 switches to the intermediate heat-exchange heat dissipation state shown by a solid line in FIG. 2. In addition, since the first main flow-path switching mechanism 23 switches to the main cooling operation state, and the second main flow-path switching mechanism 24 switches to the intermediate heat-exchange heat dissipation state, the first downstream-side main expansion mechanism 44 and the second downstream-side main expansion mechanism 66 are closed. At the time of the cooling operation, since the sub-refrigerant-circuit cooling action is performed, the sub-flow-path switching mechanism 82 switches to the sub-cooling operation state shown by a solid line in FIG. 2.

In the state of the main refrigerant circuit 20, the main refrigerant at a low pressure (LPh) (refer to point A in FIGS. 2 and 3) in the refrigeration cycle is sucked into the first main compressor 21, and, at the first main compressor 21, the main refrigerant is compressed to an intermediate pressure (MPh1) in the refrigeration cycle and is discharged (refer to point B in FIGS. 2 and 3).

The main refrigerant at the intermediate pressure discharged from the first main compressor 21 is sent to the intermediate heat exchanger 26 via the second main flow-path switching mechanism 24, and, at the intermediate heat exchanger 26, exchanges heat with outdoor air that is sent by the heat-source-side fan 28 and is cooled (refer to point C in FIGS. 2 and 3).

The main refrigerant at the intermediate pressure that has been cooled at the intermediate heat exchanger 26 is further cooled by, after passing through the check mechanism 62, merging with a main refrigerant at an intermediate pressure that is sent to the suction side of the second main compressor 22 from the intermediate injection pipe 31 (the second intermediate injection pipe 31b) (refer to point D in FIGS. 2 and 3).

The main refrigerant at the intermediate pressure provided by injection of the main refrigerant from the intermediate injection pipe 31 is sucked into the second main compressor 22, and, at the second main compressor 22, is compressed to a high pressure (HPh) in the refrigeration cycle and is discharged (refer to point E in FIGS. 2 and 3). Here, the main refrigerant at the high pressure discharged from the second main compressor 22 has a pressure that exceeds the critical pressure of the main refrigerant.

The main refrigerant at the high pressure discharged from the second main compressor 22 is sent to the main heat-source-side heat exchanger 25, and, at the main heat-source-side heat exchanger 25, exchanges heat with outdoor air that is sent by the heat-source-side fan 28 and is cooled (refer to point F in FIGS. 2 and 3).

After the main refrigerant at the high pressure that has been cooled at the main heat-source-side heat exchanger 25 has passed through the inlet check mechanism 41 of the bridge circuit 40, a part of the main refrigerant branches off into the intermediate injection pipe 31 in accordance with the opening degree of the intermediate injection expansion mechanism 33 and the remaining part is sent to the economizer heat exchanger 32 (the first economizer flow path 32a). The main refrigerant at the high pressure that has branched off into the intermediate injection pipe 31 is decompressed to the intermediate pressure (MPh1) and is brought into a gas-liquid two-phase state (refer to point K in FIGS. 2 and 3) in the intermediate injection expansion mechanism 33, and is sent to the economizer heat exchanger 32 (the second economizer flow path 32b). At the economizer heat exchanger 32, the main refrigerant at the high pressure that flows in the first economizer flow path 32a exchanges heat with the main refrigerant at the intermediate pressure and in the gas-liquid two-phase state that flows in the second economizer flow path 32b, and is cooled (refer to point G in FIGS. 2 and 3). In contrast, the main refrigerant at the intermediate pressure and in the gas-liquid two-phase state that flows in the second economizer flow path 32b exchanges heat with the main refrigerant at the high pressure that flows in the first economizer flow path 32a and is heated (refer to point L in FIGS. 2 and 3), and, as described above, merges with the main refrigerant at the intermediate pressure that has been cooled at the intermediate heat exchanger 26, and is sent to the suction side of the second main compressor 22.

Here, the opening degree of the intermediate injection expansion mechanism 33 is adjusted based on a superheating degree SHh1 of a main refrigerant at an outlet of the economizer heat exchanger 32 on a side of the intermediate injection pipe 31. For example, the control unit 9 controls the opening degree of the intermediate injection expansion mechanism 33 so that the superheating degree SHh1 becomes a target value SHh1$t$. Note that the superheating degree SHh1 is obtained by converting the pressure (MPh1) of the main refrigerant that is detected by the pressure sensor 93 into saturation temperature, and subtracting the saturation temperature from the temperature of the main refrigerant that is detected by the temperature sensor 35.

The main refrigerant at the high pressure that has been cooled at the economizer heat exchanger 32 is sent to the upstream-side main expansion mechanism 27, serving as a first main expansion mechanism, and, at the upstream-side main expansion mechanism 27, is decompressed to the intermediate pressure (MPh2) in the refrigeration cycle, and is brought into a gas-liquid two-phase state (refer to point H in FIGS. 2 and 3).

The main refrigerant at the intermediate pressure that has been decompressed at the upstream-side main expansion mechanism 27 is sent to the sub-usage-side heat exchanger 85 (second sub-flow path 85*b*).

On the other hand, at the sub-refrigerant circuit 80, the sub-refrigerant (refer to point R in FIGS. 2 and 3) at a low pressure (LPs) in the refrigeration cycle is sucked into the sub-compressor 81, and, at the sub-compressor 81, the sub-refrigerant is compressed to a high pressure (HPs) in the refrigeration cycle and is discharged (refer to point S in FIGS. 2 and 3).

The sub-refrigerant at the high pressure discharged from the sub-compressor 81 is sent to the sub-heat-source-side heat exchanger 83 via the sub-flow-path switching mechanism 82, and, at the sub-heat-source-side heat exchanger 83, exchanges heat with outdoor air that is sent by the sub-side fan 86 and is cooled (refer to point T in FIGS. 2 and 3).

The sub-refrigerant at the high pressure that has been cooled at the sub-heat-source-side heat exchanger 83 is sent to the sub-expansion mechanism 84, and, at the sub-expansion mechanism 84, is decompressed to a low pressure and is brought into a gas-liquid two-phase state (refer to point U in FIGS. 2 and 3).

Then, at the sub-usage-side heat exchanger 85, a main refrigerant at the intermediate pressure that flows in the second sub-flow path 85*b* exchanges heat with the sub-refrigerant at the low pressure and in the gas-liquid two-phase state that flows in the first sub-flow path 85*a*, and is cooled (refer to point I in FIGS. 2 and 3). In contrast, the sub-refrigerant at the low pressure and in the gas-liquid two-phase state that flows in the first sub-flow path 85*a* exchanges heat with the main refrigerant at the intermediate pressure that flows in the second sub-flow path 85*b* and is heated (refer to point R in FIGS. 2 and 3), and is sucked in on the suction side of the sub-compressor 81 again via the sub-flow-path switching mechanism 82.

Here, the operating capacity of the sub-compressor 81 is adjusted based on the low pressure LPs of the sub-refrigerant circuit 80. For example, the control unit 9 controls the operating capacity (operating frequency and number of rotations) of the sub-compressor 81 so that the low pressure LPs becomes a target value LPst. Note that the low pressure LPs is detected by the pressure sensor 101. The opening degree of the sub-expansion mechanism 84 is adjusted based on a superheating degree SHs1 of a sub-refrigerant at an outlet of the sub-usage-side heat exchanger 85 on a side of the sub-refrigerant circuit 80. For example, the control unit 9 controls the opening degree of the sub-expansion mechanism 84 so that the superheating degree SHs1 becomes a target value SHs1*t*. Note that the superheating degree SHs1 is obtained by converting the pressure (LPs) of the sub-refrigerant that is detected by the pressure sensor 101 into saturation temperature, and subtracting the saturation temperature from the temperature of the sub-refrigerant that is detected by the temperature sensor 102.

The main refrigerant at the intermediate pressure that has been cooled at the sub-usage-side heat exchanger 85 is sent to the main usage-side expansion mechanisms 71*a* and 71*b*, serving as second main expansion mechanisms, via the outlet check mechanism 43 of the bridge circuit 40 and the first main refrigerant connection pipe 11, and, at the main usage-side expansion mechanisms 71*a* and 71*b*, is decompressed to the low pressure (LPh) and is brought into a gas-liquid two-phase state (refer to points J in FIGS. 2 and 3).

The main refrigerant at the low pressure that has been decompressed at the main usage-side expansion mechanisms 71*a* and 71*b* is sent to the corresponding main usage-side heat exchangers 72*a* and 72*b*, and, at the corresponding main usage-side heat exchangers 72*a* and 72*b*, exchanges heat with indoor air that is sent by the corresponding usage-side fans 73*a* and 73*b*, is heated, and evaporates (refer to the point A in FIGS. 2 and 3). In contrast, the indoor air exchanges heat with the main refrigerant at the low pressure and in the gas-liquid two-phase state that flows in the main usage-side heat exchangers 72*a* and 72*b* and is cooled, as a result of which the interior of a room is cooled.

The main refrigerant at the low pressure that has evaporated at the main usage-side heat exchangers 72*a* and 72*b* is sent to the suction side of the first main compressor 21 via the second main refrigerant connection pipe 12 and the first main flow-path switching mechanism 23, and is sucked into the first main compressor 21 again. In this way, the cooling operation accompanying the sub-refrigerant-circuit cooling action is performed.

<Heating Operation Accompanying Sub-Refrigerant-Circuit Heating Action>

At the time of the heating operation, the first main flow-path switching mechanism 23 switches to the main heating operation state shown by a broken line in FIG. 4, and the second main flow-path switching mechanism 24 switches to the intermediate heat-exchange bypass state shown by a broken line in FIG. 4. In addition, since the first main flow-path switching mechanism 23 switches to the main heating operation state, and the second main flow-path switching mechanism 24 switches to the intermediate heat-exchange bypass state, the first downstream-side main expansion mechanism 44 and the second downstream-side main expansion mechanism 66 are opened. At the time of the heating operation, since the sub-refrigerant-circuit heating action is performed, the sub-flow-path switching mechanism 82 switches to the sub-heating operation state shown by a broken line in FIG. 4.

In the state of the main refrigerant circuit 20, the main refrigerant at the low pressure (LPh) (refer to point A in FIGS. 4 and 5) in the refrigeration cycle is sucked into the first main compressor 21, and, at the first main compressor 21, the main refrigerant is compressed to the intermediate pressure (MPh1) in the refrigeration cycle and is discharged (refer to point B in FIGS. 4 and 5).

The main refrigerant at the intermediate pressure that has been discharged from the first main compressor 21 is sent to a portion between the check mechanism 62 of the intermediate refrigerant pipe 61 (the third intermediate refrigerant pipe 61*c*) and the suction side of the second main compressor 22 via the second main flow-path switching mechanism 24 and the intermediate heat-exchange bypass pipe 63 without dissipating heat at the intermediate heat exchanger 26.

The main refrigerant at the intermediate pressure that has bypassed the intermediate heat exchanger 26 is cooled by merging with a main refrigerant at an intermediate pressure that is sent to the suction side of the second main compressor 22 from the intermediate injection pipe 31 (the second intermediate injection pipe 31*b*) (refer to point D in FIGS. 4 and 5).

The main refrigerant at the intermediate pressure provided by injection of the main refrigerant from the intermediate injection pipe 31 is sucked into the second main compressor 22, and, at the second main compressor 22, is compressed to the high pressure (HPh) in the refrigeration cycle and is discharged (refer to point E in FIGS. 4 and 5). Here, the main refrigerant at the high pressure discharged from the second main compressor 22 has a pressure that exceeds the critical pressure of the main refrigerant.

The main refrigerant at the high pressure that has been discharged from the second main compressor 22 is sent to the main usage-side heat exchangers 72a and 72b via the first main flow-path switching mechanism 23 and the second main refrigerant connection pipe 12, and, at the main usage-side heat exchangers 72a and 72b, exchanges heat with indoor air that is sent by the usage-side fans 73a and 73b and dissipates heat (refer to points J in FIGS. 4 and 5). In contrast, the indoor air exchanges heat with the main refrigerant at the high pressure that flows in the main usage-side heat exchangers 72a and 72b and is heated, as a result of which the interior of a room is heated.

After the main refrigerant at the high pressure that has dissipated heat at the main usage-side heat exchangers 72a and 72b has passed through the main usage-side expansion mechanisms 71a and 71b, the first main refrigerant connection pipe 11, and the inlet check mechanism 42 of the bridge circuit 40, a part of the main refrigerant branches off into the intermediate injection pipe 31 in accordance with the opening degree of the intermediate injection expansion mechanism 33 and the remaining part is sent to the economizer heat exchanger 32 (the first economizer flow path 32a). The main refrigerant at the high pressure that has branched off into the intermediate injection pipe 31 is decompressed to the intermediate pressure (MPh1) and is brought into a gas-liquid two-phase state (refer to point K in FIGS. 4 and 5) in the intermediate injection expansion mechanism 33, and is sent to the economizer heat exchanger 32 (the second economizer flow path 32b). At the economizer heat exchanger 32, the main refrigerant at the high pressure that flows in the first economizer flow path 32a exchanges heat with the main refrigerant at the intermediate pressure and in the gas-liquid two-phase state that flows in the second economizer flow path 32b, and is cooled (refer to point G in FIGS. 4 and 5). In contrast, the main refrigerant at the intermediate pressure and in the gas-liquid two-phase state that flows in the second economizer flow path 32b exchanges heat with the main refrigerant at the high pressure that flows in the first economizer flow path 32a and is heated (refer to point L in FIGS. 4 and 5), and, as described above, merges with the main refrigerant at the intermediate pressure that has bypassed the intermediate heat exchanger 26, and is sent to the suction side of the second main compressor 22.

Here, as at the time of the cooling operation, the opening degree of the intermediate injection expansion mechanism 33 is adjusted based on a superheating degree SHh1 of a main refrigerant at the outlet of the economizer heat exchanger 32 on the side of the intermediate injection pipe 31.

The main refrigerant at the high pressure that has been cooled at the economizer heat exchanger 32 is sent to the upstream-side main expansion mechanism 27, serving as a first main expansion mechanism, and, at the upstream-side main expansion mechanism 27, is decompressed to the intermediate pressure (MPh2) in the refrigeration cycle, and is brought into a gas-liquid two-phase state (refer to point H in FIGS. 4 and 5).

The main refrigerant at the intermediate pressure that has been decompressed at the upstream-side main expansion mechanism 27 is sent to the sub-usage-side heat exchanger 85 (second sub-flow path 85b).

On the other hand, at the sub-refrigerant circuit 80, the sub-refrigerant at the low pressure (LPs) in the refrigeration cycle (refer to point R in FIGS. 4 and 5) is sucked into the sub-compressor 81, and, at the sub-compressor 81, the sub-refrigerant is compressed to the high pressure (HPs) in the refrigeration cycle and is discharged (refer to point S in FIGS. 4 and 5).

The sub-refrigerant at the high pressure that has been discharged from the sub-compressor 81 is sent to the sub-usage-side heat exchanger 85 via the sub-flow-path switching mechanism 82.

Then, at the sub-usage-side heat exchanger 85, the main refrigerant at the intermediate pressure that flows in the second sub-flow path 85b exchanges heat with the sub-refrigerant at the high pressure that flows in the first sub-flow path 85a, and is heated (refer to point I in FIGS. 4 and 5). In contrast, the sub-refrigerant at the high pressure that flows in the first sub-flow path 85a exchanges heat with the main refrigerant at the intermediate pressure that flows in the second sub-flow path 85b and is cooled (refer to point U in FIGS. 4 and 5).

The sub-refrigerant at the high pressure that has been cooled at the sub-usage-side heat exchanger 85 is sent to the sub-expansion mechanism 84, and, at the sub-expansion mechanism 84, is decompressed to a low pressure and is brought into a gas-liquid two-phase state (refer to point T in FIGS. 4 and 5).

The sub-refrigerant at the low pressure that has been decompressed at the sub-expansion mechanism 84 is sent to the sub-heat-source-side heat exchanger 83, and, at the sub-heat-source-side heat exchanger 83, exchanges heat with outdoor air that is sent by the sub-side fan 86 and is heated (refer to point R in FIGS. 4 and 5), and is sucked in on the suction side of the sub-compressor 81 again via the sub-flow-path switching mechanism 82.

Here, the operating capacity of the sub-compressor 81 is adjusted based on the high pressure HPs of the sub-refrigerant circuit 80. For example, the control unit 9 controls the operating capacity (operating frequency and number of rotations) of the sub-compressor 81 so that the high pressure HPs becomes a target value HPst. Note that the high pressure HPs is detected by the pressure sensor 103. The opening degree of the sub-expansion mechanism 84 is adjusted based on a supercooling degree SCs1 of a sub-refrigerant at the outlet of the sub-usage-side heat exchanger 85 on the side of the sub-refrigerant circuit 80. For example, the control unit 9 controls the opening degree of the sub-expansion mechanism 84 so that the supercooling degree SCs1 becomes a target value SCs1t. Note that the supercooling degree SCs1 is obtained by converting the pressure (HPs) of the sub-refrigerant that is detected by the pressure sensor 103 into saturation temperature, and subtracting the temperature of the sub-refrigerant that is detected by the temperature sensor 107 from the saturation temperature.

A part of the main refrigerant at the intermediate pressure that has been heated at the sub-usage-side heat exchanger 85 branches off into the intermediate heat-exchange feed pipe 65, and the remaining part is sent to the first downstream-side main expansion mechanism 44 of the bridge circuit 40.

The main refrigerant at the intermediate pressure that has been sent to the intermediate heat-exchange feed pipe 65 is, at the second downstream-side main expansion mechanism 66, serving as a third main expansion mechanism, decompressed to a low pressure (refer to point C in FIGS. 4 and 5), and is sent to the intermediate heat exchanger 26 that functions as an evaporator of the main refrigerant. The main refrigerant at the intermediate pressure that has been sent to the first downstream-side main expansion mechanism 44 is, at the first downstream-side main expansion mechanism 44, serving as a second main expansion mechanism, decompressed to a low pressure (refer to point F in FIGS. 4 and 5), and is sent to the main heat-source-side heat exchanger 25 that functions as an evaporator of the main refrigerant.

The main refrigerant at the low pressure that has been sent to the intermediate heat exchanger 26 evaporates by exchanging heat with outdoor air that is supplied by the heat-source-side fan 28 at the intermediate heat exchanger 26. In addition, the main refrigerant at the low pressure that has been sent to the main heat-source-side heat exchanger 25 also evaporates by exchanging heat with outdoor air that is supplied by the heat-source-side fan 28 at the main heat-source-side heat exchanger 25. Then, the main refrigerant at the low pressure that has evaporated at the main heat-source-side heat exchanger 25 is sent to the suction side of the first main compressor 21 via the first main flow-path switching mechanism 23, and the main refrigerant at the low pressure that has evaporated at the intermediate heat exchanger 26 is sent to the suction side of the first main compressor 21 via the second main flow-path switching mechanism 24 and the intermediate heat-exchange return pipe 67. Then, both the main refrigerants merge and are sucked into the first main compressor 21 again. In this way, the heating operation accompanying the sub-refrigerant-circuit heating action is performed.

(3) Features

Next, the features of the refrigeration cycle device 1 are described.

<A>

Here, as described above, the refrigeration cycle device includes the main refrigerant circuit 20 and the sub-refrigerant circuit 80 and is configured to, by causing the sub-usage-side heat exchanger 85 to function as an evaporator or a radiator of the sub-refrigerant, cool or heat the main refrigerant that flows between the main heat-source-side heat exchanger 25 and the main usage-side heat exchangers 72a and 72b. Moreover, here, in the main refrigerant circuit 20, the upstream-side main expansion mechanism 27, serving as a first main expansion mechanism, that decompresses the main refrigerant, and the main usage-side expansion mechanisms 71a and 71b and the first downstream-side main expansion mechanism 44, serving as second main expansion mechanisms, are provided on an upstream side and a downstream side of the sub-usage-side heat exchanger 85.

Therefore, here, when either the cooling operation or the heating operation is performed, it is possible to cause the main refrigerant at the intermediate pressure (MPh2) that has been decompressed by the first main expansion mechanism 27 and that has not yet been decompressed by the second main expansion mechanisms 71a, 71b, and 44 to flow to the sub-usage-side heat exchanger 85. That is, at the time of the cooling operation (when the first main flow-path switching mechanism 23 is in the main cooling operation state), it is possible to cause the main refrigerant to flow to the main heat-source-side heat exchanger 25, the first main expansion mechanism 27, the sub-usage-side heat exchanger 85, the second main expansion mechanisms 71a and 71b, and the main usage-side heat exchangers 72a and 72b in this order (refer to the points E, F, G, H, I, J, and A in FIG. 3). At the time of the heating operation (when the first main flow-path switching mechanism 23 is in the main heating operation state), it is possible to cause the main refrigerant to flow to the main usage-side heat exchangers 72a and 72b, the first main expansion mechanism 27, the sub-usage-side heat exchanger 85, the second main expansion mechanism 44, and the main heat-source-side heat exchanger 25 in this order (refer to the points E, J, G, H, I, F, and A in FIG. 5).

Therefore, here, when the heating operation is performed, in the sub-usage-side heat exchanger 85, the temperature difference with respect to the sub-refrigerant (refer to the points S and U in FIG. 5) that exchanges heat with the main refrigerant (refer to the points H and I in FIG. 5) is increased. Therefore, the heating capacity of the main refrigerant in the sub-usage-side heat exchanger 85 is increased, the enthalpy of the main refrigerant that is sent to the main heat-source-side heat exchanger 25 is easily increased (refer to the point I in FIG. 5), and the heat-exchange amount Qe that is required to evaporate the main refrigerant in the main heat-source-side heat exchanger 25 can be decreased (refer to the points C and A in FIG. 5).

In this way, here, in the structure that includes the main refrigerant circuit 20 and the sub-refrigerant circuit 80 and that, by causing the sub-usage-side heat exchanger 85 to function as a radiator of the sub-refrigerant, heats the main refrigerant that flows between the main heat-source-side heat exchanger 25 and the main usage-side heat exchangers 72a and 72b, it is possible to decrease the heat-exchange amount Qe that is required to evaporate the main refrigerant at the main heat-source-side heat exchanger 25 when performing the heating operation. Therefore, since the heat exchange rate at the main heat-source-side heat exchanger 25 is increased and the low pressure (LPh) of the main refrigerant is increased, it is possible to reduce the consumption power of the main compressors 21 and 22. In addition, when the low pressure of the main refrigerant is increased at the time of the heating operation, the formation of frost on the main heat-source-side heat exchanger 25 can be suppressed, as a result of which it is possible to reduce the frequency with which a defrosting operation is performed.

In particular, here, since, as the main refrigerant, carbon dioxide having a coefficient of performance that is lower than that of, for example, a HFC refrigerant is used, as described above, decreasing the heat-exchange amount Qe that is required to evaporate the main refrigerant at the main heat-source-side heat exchanger 25 by using the sub-refrigerant circuit 80 reduces the consumption power of the main compressors 21 and 22 and thus leads to increasing the coefficient of performance. This is very effective.

<B>

Here, as described above, when the first main flow-path switching mechanism 23 is in the main cooling operation state (at the time of the cooling operation), the intermediate heat exchanger 26 is capable of cooling the main refrigerant at the intermediate pressure that flows between the first main compressor 21 (the low-stage-side compression element 21a) and the second main compressor 22 (the high-stage-side compression element 22a) (refer to the point C in FIG. 3). Therefore, it is possible to keep low the temperature of the main refrigerant at the high pressure that is discharged from the second main compressor 22 (refer to the point E in FIG. 3). Moreover, here, as described above, when the first main flow-path switching mechanism 23 is in the main heating operation state (at the time of the heating operation), the intermediate heat exchanger 26 is capable of evaporating the main refrigerant that has been heated at the sub-usage-side heat exchanger 85.

In particular, here, at the time of the heating operation, the main refrigerant at the intermediate pressure that flows between the low-stage-side compression element 21a and the high-stage-side compression element 22a is sent to the high-stage-side compression element 22a by bypassing the intermediate heat exchanger 26 by using the intermediate heat-exchange bypass pipe 63, and a part of the main refrigerant that has been heated at the sub-usage-side heat exchanger 85 can be evaporated at the intermediate heat exchanger 26 by using the intermediate heat-exchange feed pipe 65 and the intermediate heat-exchange return pipe 67, and can be returned to the suction side of the first main compressor 21. That is, at the time of the heating operation, it is possible to cause the main refrigerant to flow to the main usage-side heat exchangers 72a and 72b, the first main expansion mechanism 27, and the sub-usage-side heat exchanger 85 in this order, to thereafter branch off in two, to flow to the second main expansion mechanism 44 and the main heat-source-side heat exchanger 25 in this order, and to flow to the third main expansion mechanism 66 and the intermediate heat exchanger 26 in this order; and the intermediate heat exchanger 26 is capable of being caused to function as an evaporator of the main refrigerant that is in parallel with the main heat-source-side heat exchanger 26.

Therefore, here, it is possible to increase the evaporation capacity compared with that when the main refrigerant that has been heated at the sub-usage-side heat exchanger 85 is evaporated by only the main heat-source-side heat exchanger 25. Therefore, since the low pressure (LPh) of the main refrigerant is further increased, it is possible to further reduce the consumption power of the main compressors 21 and 22.

<C>

Here, as described above, since carbon dioxide is used as the main refrigerant, and a refrigerant having a low GWP or a natural refrigerant having a coefficient of performance that is higher than that of carbon dioxide is used as the sub-refrigerant, it is possible to reduce environmental load, such as global warming.

(4) Modifications

<Modification 1>

Figure 6:
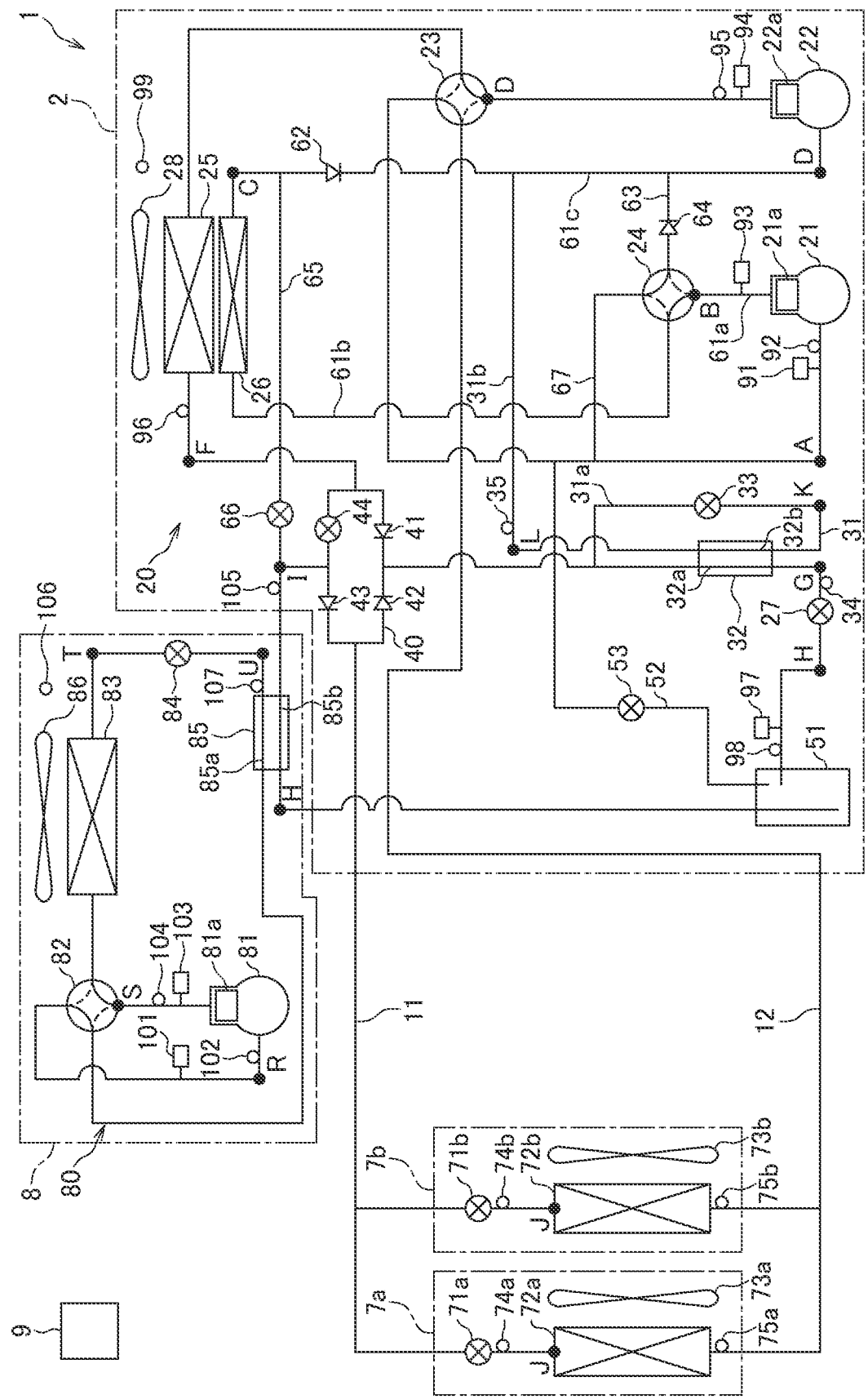
FIG. 6 is a schematic view of a configuration of a refrigeration cycle device of Modification 1.

Although, in the embodiment above, the structure in which the main refrigerant that has been decompressed at the upstream-side main expansion mechanism 27, serving as a first main expansion mechanism, is directly sent to the sub-usage-side heat exchanger 85 (the second sub-flow path 85b) is used, it is not limited thereto. As shown in FIG. 6, a gas-liquid separator 51 may be provided between the upstream-side main expansion mechanism 27 and the sub-usage-side heat exchanger 85.

The gas-liquid separator 51 is a device that causes the main refrigerant to undergo gas-liquid separation, and, here, is a container at which the main refrigerant that has been decompressed at the upstream-side main expansion mechanism 27 undergoes the gas-liquid separation. In addition, when the gas-liquid separator 51 is provided, it is desirable to further provide a degassing pipe 52 that extracts a main refrigerant in a gas state from the gas-liquid separator 51 and sends the main refrigerant to the suction side of the main compressors 21 and 22. Here, the degassing pipe 52 is a refrigerant pipe that sends the main refrigerant in the gas state extracted from the gas-liquid separator 51 to the suction side of the first main compressor 21. One end of the degassing pipe 52 is connected so as to communicate with an upper space of the gas-liquid separator 51, and the other end of the degassing pipe 52 is connected to the suction side of the first main compressor 21. The degassing pipe 52 has a degassing expansion mechanism 53. The degassing expansion mechanism 53 is a device that decompresses the main refrigerant, and, here, is an expansion mechanism that decompresses the main refrigerant that flows in the degassing pipe 52. The degassing expansion mechanism 53 is, for example, an electrically powered expansion valve.

Even in this case, as in the embodiment above, it is possible to perform the cooling operation accompanying the sub-refrigerant-circuit cooling action and the heating operation accompanying the sub-refrigerant-circuit heating action.

Moreover, here, a main refrigerant in a liquid state after removal of the main refrigerant in the gas state at the gas-liquid separator 51 can be sent to the sub-usage-side heat exchanger 85. Therefore, at the time of the cooling operation, the sub-usage-side heat exchanger 85 is capable of further lowering the temperature of the main refrigerant. In addition, at the time of the heating operation, it is possible to further increase the low pressure (LPh) of the main refrigerant by reducing the flow rate of the main refrigerant that is sent to the sub-usage-side heat exchanger 85, the main heat-source-side heat exchanger 25, and the intermediate heat exchanger 26 and by reducing pressure loss.

<Modification 2>

Although, in the embodiment and Modification 1, the structure including the intermediate injection pipe 31 and the economizer heat exchanger 32 is used, it is not limited thereto. It is possible not to provide the intermediate injection pipe 31 and the economizer heat exchanger 32.

<Modification 3>

Although, in the embodiment and Modifications 1 and 2 above, at the time of the heating operation, the intermediate heat exchanger 26 is caused to function as an evaporator of the main refrigerant by providing the intermediate heat-exchange feed pipe 65 and the intermediate heat-exchange return pipe 67, it is not limited thereto. The refrigerant may be only caused to bypass the intermediate heat exchanger 26 at the time of the heating operation without providing the intermediate heat-exchange feed pipe 65 and the intermediate heat-exchange return pipe 67.

<Modification 4>

Although, in the embodiment and Modifications 1 to 3 above, the structure in which the intermediate heat exchanger 26 that cools the main refrigerant is provided between the first main compressor 21 and the second main compressor 22 is used, it is not limited thereto. It is possible not to provide the intermediate heat exchanger 26.

<Modification 5>

Although, in the embodiment and Modifications 1 to 4 above, the multi-stage compressor is constituted by the plurality of main compressors 21 and 22, it is not limited thereto. The multi-stage compressor may be constituted by one main compressor including the compression elements 21a and 21b.

Although the embodiment of the present disclosure is described above, it is to be understood that various changes can be made in the forms and details without departing from the spirit and the scope of the present disclosure described in the claims.

INDUSTRIAL APPLICABILITY

The present disclosure is widely applicable to a refrigeration cycle device that includes a main refrigerant circuit in which a main refrigerant circulates and a sub-refrigerant circuit in which a sub-refrigerant circulates, and that is configured to, by causing a sub-usage-side heat exchanger of the sub-refrigerant circuit to function as an evaporator or a radiator of the sub-refrigerant, cool or heat the main refrigerant that flows between a main heat-source-side heat exchanger of the main refrigerant circuit and a main usage-side heat exchanger of the main refrigerant circuit.

REFERENCE SIGNS LIST 1 refrigeration cycle device
20 main refrigerant circuit
21, 22 main compressor
21a low-stage-side compression element
22a high-stage-side compression element
23 first main flow-path switching mechanism
25 main heat-source-side heat exchanger
26 intermediate heat exchanger
27 upstream-side main expansion mechanism (first main expansion mechanism)
44 first downstream-side main expansion mechanism (second main expansion mechanism)
63 intermediate heat-exchange bypass pipe
65 intermediate heat-exchange feed pipe
66 second downstream-side main expansion mechanism (third main expansion mechanism)
67 intermediate heat-exchange return pipe
71a, 71b main usage-side expansion mechanism (second main expansion mechanism)
72a, 72b main usage-side heat exchanger
80 sub-refrigerant circuit
81 sub-compressor
82 sub-flow-path switching mechanism
83 sub-heat-source-side heat exchanger
85 sub-usage-side heat exchanger

CITATION LIST

Patent Literature

PTL 1: Japanese Patent No. 4753719

The invention claimed is:

1. A refrigeration cycle device comprising:
a main refrigerant circuit having
   a main compressor configured to compress a main refrigerant,
   a main heat-source-side heat exchanger configured to function as a radiator or an evaporator of the main refrigerant,
   a main usage-side heat exchanger configured to function as an evaporator or a radiator of the main refrigerant,
   a sub-usage-side heat exchanger configured to function as a cooler or a heater of the main refrigerant that flows between the main heat-source-side heat exchanger and the main usage-side heat exchanger, and
   a main flow-path switching valve configured to switch between a main cooling operation state, in which the main refrigerant is caused to circulate so that the main usage-side heat exchanger functions as the evaporator of the main refrigerant, and a main heating operation state, in which the main refrigerant is caused to circulate so that the main usage-side heat exchanger functions as the radiator of the main refrigerant; and
a sub-refrigerant circuit having
   a sub-compressor configured to compress a sub-refrigerant,
   a sub-heat-source-side heat exchanger configured to function as a radiator or an evaporator of the sub-refrigerant,
   the sub-usage-side heat exchanger configured to function as an evaporator of the sub-refrigerant and to cool the main refrigerant that flows between the main heat-source-side heat exchanger and the main usage-side heat exchanger, or configured to function as a radiator of the sub-refrigerant and to heat the main refrigerant that flows between the main usage-side heat exchanger and the main heat-source-side heat exchanger, and
   a sub-flow-path switching valve configured to switch between a sub-cooling operation state, in which the sub-refrigerant is caused to circulate so that the sub-usage-side heat exchanger functions as the evaporator of the sub-refrigerant, and a sub-heating operation state, in which the sub-refrigerant is caused to circulate so that the sub-usage-side heat exchanger functions as the radiator of the sub-refrigerant,
wherein
the main refrigerant circuit further has
an upstream-side main expansion valve,
a main usage side expansion valve provided together with the main usage side heat exchanger at a use unit, and
a first downstream side main expansion valve,
wherein the refrigeration cycle device further has a controller configured to control the operation of the refrigeration cycle device,
wherein the controller is configured to
control the main flow-path switching valve to switch between the main cooling operation state, wherein the main refrigerant flows to the main heat-source-side heat exchanger, the upstream-side main expansion valve, the sub-usage-side heat exchanger, the main usage side expansion valve in this order, and the main heating operation state, wherein the main refrigerant flows to the main usage-side heat exchanger, the upstream-side main expansion valve, the sub-usage-side heat exchanger, the downstream-side main expansion valve, and the main heat-source-side heat exchanger in this order,
control the sub-flow-path switching valve to switch between the sub-cooling operation state and the sub-heating operation state,
control the upstream side expansion valve to decompress the main refrigerant that flows between the main heat-source-side heat exchanger and the sub-usage-side heat exchanger during the main cooling operation states in to decompress the main refrigerant that flows between the main usage-side heat exchanger and the sub-usage-side heat exchanger during the main heating operation state,
control the main usage side expansion valve to decompress the main refrigerant that flows between the sub-usage-side heat exchanger and the main usage-side heat exchanger during the main cooling operation state, and
control the first downstream-side main expansion mechanism to decompress the main refrigerant that flows between the sub-usage-side heat exchanger and the main heat source-side heat exchanger during the main heating operation state.

2. The refrigeration cycle device according to claim 1, wherein the main compressor includes a low-stage-side compressor configured to compress the main refrigerant and a high-stage-side compressor configured to compress the main refrigerant discharged from the low-stage-side compressor, and wherein the main refrigerant circuit has an intermediate heat exchanger that, when the main flow-path switching valve is in the main cooling operation state, configured to function as a cooler of the main refrigerant that flows between the low-stage-side compressor and the high-stage-side compressor, and, when the main flow-path switching valve is in the main heating operation state, configured to function as an evaporator of the main refrigerant that has been heated at the sub-usage-side heat exchanger.

3. The refrigeration cycle device according to claim 2, wherein the main refrigerant circuit has an intermediate heat-exchange bypass pipe that, when the main flow-path switching valve is in the main heating operation state, configured to cause the main refrigerant that has been discharged from the low-stage-side compressor to bypass the intermediate heat exchanger and to be sent to the high-stage-side compressor, an intermediate heat-exchange feed pipe configured to cause that causes the main refrigerant that flows between the sub-usage-side heat exchanger and the main heat-source-side heat exchanger to branch off and to be sent to the intermediate heat exchanger, and an intermediate heat-exchange return pipe configured to cause the main refrigerant to return to a suction side of the main compressor from the intermediate heat exchanger.

4. The refrigeration cycle device according to claim 3, wherein, when the main flow-path switching valve is in the main heating operation state, the controller is configured to control the upstream-side main expansion valve to decompress the main refrigerant that flows between the main usage-side heat exchanger and the sub-usage-side heat exchanger, and the first downstream-side main expansion valve to decompress the main refrigerant that flows between the sub-usage-side heat exchanger and the main heat-source-side heat exchanger, and wherein the main refrigerant circuit has a second downstream-side main expansion valve and the controller is configured to control the second downstream side main expansion valve to decompress the main refrigerant that flows in the intermediate heat-exchange feed pipe.

5. The refrigeration cycle device according to claim 4, wherein the main refrigerant is carbon dioxide, and
wherein the sub-refrigerant is a HFC refrigerant, a HFO refrigerant, or a mixture refrigerant in which the HFC refrigerant and the HFO refrigerant are mixed, the HFC refrigerant, the HFO refrigerant, and the mixture refrigerant having a GWP that is 750 or less.

6. The refrigeration cycle device according to claim 3, wherein the main refrigerant is carbon dioxide, and
wherein the sub-refrigerant is a HFC refrigerant, a HFO refrigerant, or a mixture refrigerant in which the HFC refrigerant and the HFO refrigerant are mixed, the HFC refrigerant, the HFO refrigerant, and the mixture refrigerant having a GWP that is 750 or less.

7. The refrigeration cycle device according to claim 3, wherein the main refrigerant is carbon dioxide, and
wherein the sub-refrigerant is a natural refrigerant having a coefficient of performance that is higher than a coefficient of performance of the carbon dioxide.

8. The refrigeration cycle device according to claim 2, wherein the main refrigerant is carbon dioxide, and
wherein the sub-refrigerant is a HFC refrigerant, a HFO refrigerant, or a mixture refrigerant in which the HFC refrigerant and the HFO refrigerant are mixed, the HFC refrigerant, the HFO refrigerant, and the mixture refrigerant having a GWP that is 750 or less.

9. The refrigeration cycle device according to claim 2, wherein the main refrigerant is carbon dioxide, and
wherein the sub-refrigerant is a natural refrigerant having a coefficient of performance that is higher than a coefficient of performance of the carbon dioxide.

10. The refrigeration cycle device according to claim 1, wherein the main refrigerant is carbon dioxide, and
wherein the sub-refrigerant is a HFC refrigerant, a HFO refrigerant, or a mixture refrigerant in which the HFC refrigerant and the HFO refrigerant are mixed, the HFC refrigerant, the HFO refrigerant, and the mixture refrigerant having a GWP that is 750 or less.

11. The refrigeration cycle device according to claim 1, wherein the main refrigerant is carbon dioxide, and
wherein the sub-refrigerant is a natural refrigerant having a coefficient of performance that is higher than a coefficient of performance of the carbon dioxide.

* * * * *